United States Patent [19]
Izumi et al.

[11] Patent Number: 4,847,651
[45] Date of Patent: Jul. 11, 1989

[54] DISPLAY DEVICE FOR USE IN A CAMERA

[75] Inventors: Shuji Izumi, Sakai; Masaaki Nakai, Kawachinagano; Manabu Inoue, Kobe; Akihiko Fujino, Sakai; Kunio Kawamura, Sakai; Yuji Takarabe, Sakai; Masatake Niwa, Sakai, all of Japan

[73] Assignee: Minolta Camera Kabushiki Kaisha, Osaka, Japan

[21] Appl. No.: 808,251

[22] Filed: Dec. 12, 1985

[30] Foreign Application Priority Data

| Dec. 14, 1984 | [JP] | Japan | 59-264940 |
| Apr. 2, 1985 | [JP] | Japan | 60-70619 |
| Apr. 2, 1985 | [JP] | Japan | 60-70620 |
| Apr. 2, 1985 | [JP] | Japan | 60-70621 |
| Apr. 18, 1985 | [JP] | Japan | 60-84197 |
| Apr. 18, 1985 | [JP] | Japan | 60-84198 |
| Apr. 23, 1985 | [JP] | Japan | 60-88304 |
| Apr. 23, 1985 | [JP] | Japan | 60-88305 |
| Apr. 24, 1985 | [JP] | Japan | 60-89595 |
| Apr. 24, 1985 | [JP] | Japan | 60-89596 |
| Apr. 25, 1985 | [JP] | Japan | 60-90217 |
| Sep. 6, 1985 | [JP] | Japan | 60-198244 |

[51] Int. Cl.[4] .......................... G03B 17/18
[52] U.S. Cl. ..................... 354/471; 354/443; 354/474

[58] Field of Search ............ 354/442, 443, 465, 471, 354/472, 474, 475, 289.1

[56] References Cited

U.S. PATENT DOCUMENTS

| 4,048,644 | 9/1977 | Numata | 354/471 |
| 4,312,579 | 1/1982 | Araki | 354/443 |
| 4,320,944 | 3/1982 | Nakai | 354/443 |
| 4,365,880 | 12/1982 | Kiuchi et al. | 354/442 |
| 4,639,113 | 1/1987 | Ohkubo | 354/474 |
| 4,653,893 | 3/1987 | Inoue et al. | 354/443 |
| 4,673,277 | 6/1987 | Someya et al. | 354/442 |

Primary Examiner—Russell E. Adams
Attorney, Agent, or Firm—Burns, Doane, Swecker & Mathis

[57] ABSTRACT

A display device for use in a camera comprises a central processing unit and display units to display exposure data and various control modes under the control of the CPU. The display units are arranged to display the exposure data with suitable marks or characters in rows so as to make the operator to read the display easily. The CPU provides control data to deenergize the display unit at the time of initial states of the camera such as at the time of loading a battery in the camera to prevent to display confusing information.

11 Claims, 29 Drawing Sheets

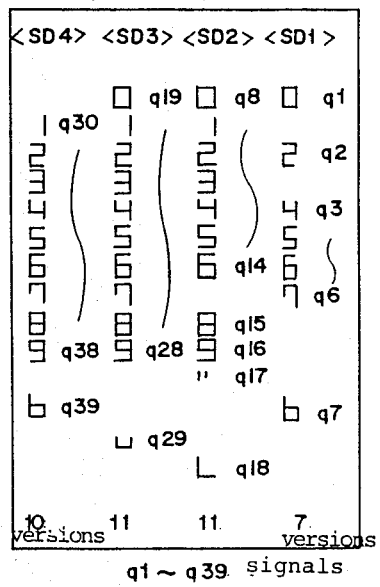

Fig. 23

| SD5 | SD5 | SD6 |
|---|---|---|

```
- -     q40    0.0        0
34.5             0.5      0.5
-1.2             1.0     -1.5
-1.7    q45     1.5     -1.5
-2.4             2.0     -2.5
-2.8             2.5     -2.5
-3.4             3.0     -3.5
-4.8    q50     3.5     -4.5
-5.6             4.0     -4.5
-6.7          over ride   -5.5
-7.8          values      -5.5
-8.5    q55   9 versions  -6.5
-9.5                      
-11.3                     
-11.6                    14 versions
-11.9                  metered manual
-22.2   q60           values including over ride values
-27.7
-32.2   q62
``` aperture values 23 versions q40~q62 signals

Fig. 22

```
        0   q71
        5   q72
            q73
  0         q74
  1         q75
  2         q76
  3         q77
  4    .    q78
                    .5  q82
                    0   q83
  8 versions        1   q84
                    2   q85
                    3   q86
                    4   q87
                    5   q88
                    6   q89
``` q71~q78
q82~q89
signals 8 versions

Pmode 1/250  F 5.6  AVE

PROGRAM $\dfrac{250}{F\ 5.6}$

Fig. 32(a)

Amode 1/250  F 5.6  AVE

A $\dfrac{250}{F\ 5.6}$ ← 106

S mode 1/250 F 5.6 AVE

M mode 8" F 1.4 SPOT
meter +6.5EV

PROGRAM $$\frac{2000}{\boxed{\pm}F\ 3.5}$$

$$\overline{\boxed{\pm}\ \ 1.5}$$

ISO
100
_____

Fig. 41(C)
PROGRAM
30
―――
F 2.8
Fig. 40(a)
Fig. 40(b)

Fig. 41(a)

$\dfrac{4000}{F22}$

Fig. 42(a)

M $\dfrac{125◂}{F--}$

Fig. 45
(a) 
(b) 
(c) 
Fig. 46
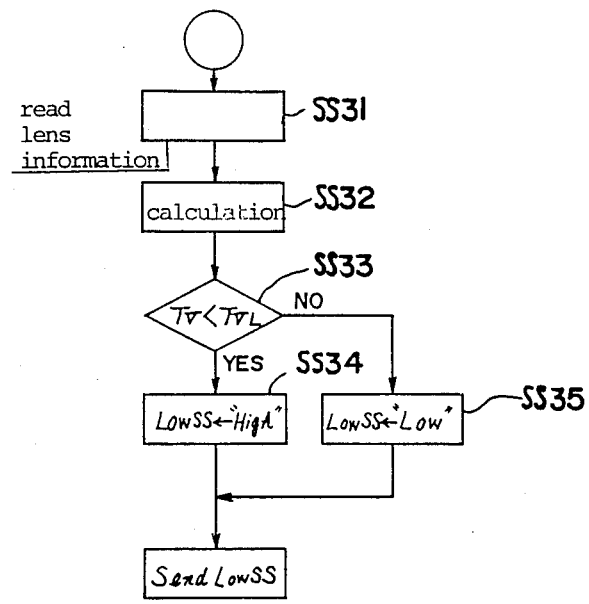

DISPLAY DEVICE FOR USE IN A CAMERA

BACKGROUND OF THE INVENTION

1. Field of the Invention

The present invention relates to a display device for use in a camera.

2. Description of the Prior Art

In automatic exposure control cameras, as the number of the functions or operations adopted in the camera increase, it is required to display many kinds of information in order to inform a user of the operations or functions which are instantaneously used or available in the camera.

It is apparent that to provide several display units for displaying each function independently causes not only the size of the camera to be bulky but also makes it difficult for the user to recognize each of the contents of the operation in a short time.

In order to avoid such problems, it is desired to decrease the number of the display units provided in the camera, displaying in condensed manner the necessary information. This measure, however, tends to make it difficult for the user to discriminate or confirm the meaning of the information for each function.

Besides the problems mentioned above, there has been proposed to use in a camera a micro processor as a central processing unit (CPU) which is operated with a predetermined program or sequence so as to process various data taken from the external circuits such as a light measurement circuit and to send the necessary data to display device for displaying the information. In this device, the data communication between the CPU and the external circuits and the display device are made with a period defined by the program. Therefore, before the light measurement circuit provides correct light measurement data to the CPU, the CPU might transfer indefinite data to the display device. The displayed data will be nonsense or confusing.

SUMMARY OF THE INVENTION

An essential object of the present invention is to provide a display device for use in a camera, with which the user can easily recognize not only the contents of the operation but the relationship between the exposure data and the operation.

A further object of the present invention is to provide a display device for use in a camera, in which the display device prevents confusing display.

A still further object of the present invention is to provide a display device for use in a camera, in which the display device displays as much necessary information as possible in such a manner that the user of the camera can recognize the present state of the camera in one glance.

According to the present invention, there is provided a display device for use in a camera which comprises.

display means for displaying various modes and data used in the camera, a central processing unit (CPU) for controlling the camera provided with a (1) primary state in which only a power supply is applied being unavailable to perform processing and a (2) control state in which the CPU is available to perform processing and to provide preliminary displaying data containing one of data for deenergizing the display of the display means and representing stand by mode occurring when the main switch is turned on before the picture taking mode is enabled, and means for transferring the preliminary displaying data at least one time to said display means when the CPU is shifted from the primary state to the control state.

By this arrangement, the display means is deenergized by the preliminary data to prevent to the display of confusing information.

Further there is provided a display device for use in a camera which comprises.

display means for displaying various modes and data used in the camera, a central processing unit (CPU) for controlling the camera provided with a (1) primary state in which only a power supply is applied being available to perform processing and a (2) control state in which the CPU is available to perform processing and provide preliminary displaying data containing one of data for deenergizing the display of the display means and representing stand by mode occurring when the main switch is turned on before the picture taking mode is enabled, said CPU outputting the preliminary displaying data at least two times when a battery for the camera is loaded and means for transferring the preliminary displaying data at least two time to said display means at the time of loading of a battery of the camera.

The preliminary display data may be transferred to the displaying means at least two times at the time of loading the battery to the camera to assure that the display of confusing information will not occur.

BRIEF EXPLANATION OF THE DRAWINGS

FIGS. 20 to 23 are respectively schematic diagrams showing relationships between the input signals and output data displayed in the internal and external display units.

FIGS. 31 to 38 and 40 to 42 are respectively schematic diagrams showing the various examples displayed in the internal and external display units.

DETAILED DESCRIPTION OF A PREFERRED EMBODIMENT

Figure 1:
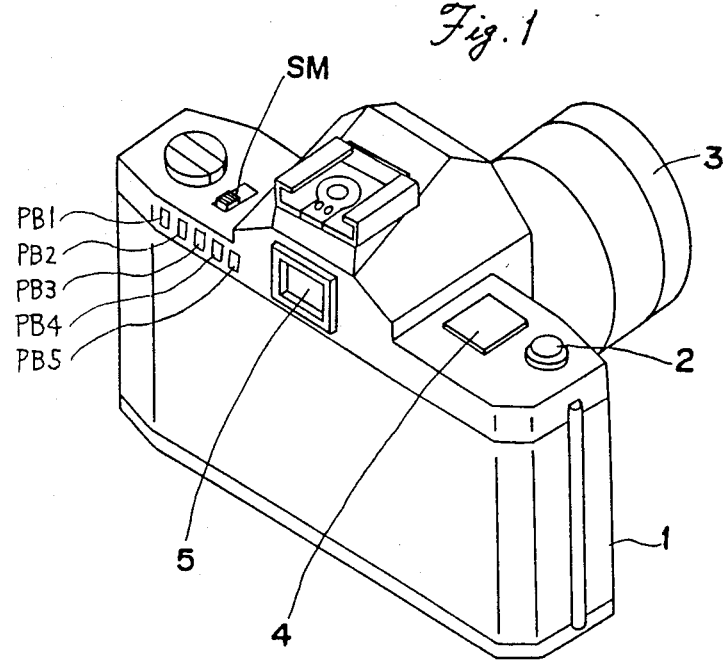
FIG. 1 is a perspective view of a camera in which the display device according to the present invention is employed.
Figure 2:
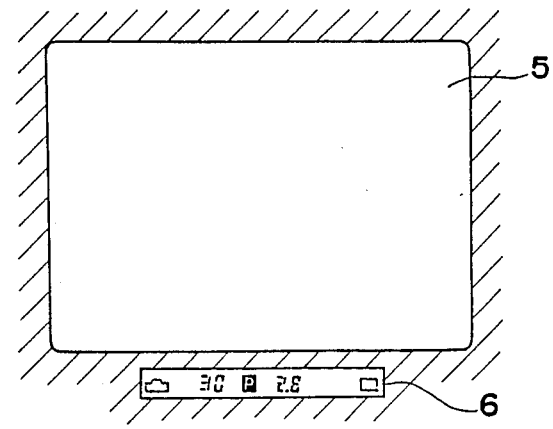
FIG. 2 is a plan view showing an example of an internal display unit used in the camera shown in FIG. 1.

Referring to FIG. 1 showing a photographic camera in which a display device according to the present invention is employed, a camera 1 is provided with a shutter button 2 and an interchangeable lens 3 having an electronic circuit arrangement for outputting to the camera 1 various data signals including the fully open and maximum diaphragm aperture values and the focal length value of the lens 3. The shutter button 2 is coupled with a light measuring switch S1 and a release switch S2 so that when the shutter button 2 is depressed down to a first depth the switch S1 is closed and when the shutter button 2 is depressed down to a second depth, the switch S2 is closed.

There are provided various operating buttons PB1 of a preview switch S10, PB2 and PB3 of program switches S11 and S12, PB4 of a exposure mode select switch S13 and PB5 of a switch S14 for modifying the exposure value.

An external display unit 4 is disposed near the shutter button 2 on the top plane of the camera 1 and is adapted for displaying calculated or set exposure data and exposure control mode and so on as mentioned in detail hereinafter.

An internal display unit 6 is provided along the lower side of a viewfinder field 5 so that when an operator looks into the viewfinder 5, various data displayed in the external display unit 4 can be seen with the display unit 6. A main switch SM is also disposed on the top of the camera 1.

Figure 3:
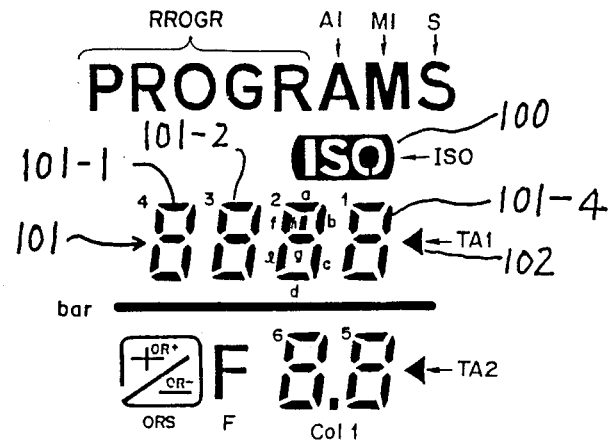
FIG. 3 is a front view showing an example of arrangement of display segments used in an external display unit employed in the camera shown in FIG. 1.

The contents displayed by the external display unit 4 are shown in FIG. 3. On the top portion of the display by the unit 4 as viewed in FIG. 3 are characters P, R, O, G, R, A, M and S for displaying exposure control modes (referred to as AE mode hereinafter). When AE mode is set to the programmed automatic exposure control mode (referred to as P mode), the characters PROGRAM are displayed with the character S deenergized. When a diaphragm aperture priority automatic exposure control mode (referred to as A mode) is set, only the character A is displayed with the characters PROGR and MS deenergized. In case of a manual exposure control mode (referred to as M mode), only the character M is displayed. In case of a shutter time priority automatic exposure control mode (referred to as S mode), only the character S is displayed. A mark 100 of characters ISO is disposed below the characters PROGRAMS and is displayed for indicating a film speed value, i.e., ISO value being displayed. A first numerical display part 101 having four digit display elements 101-1, 101-2, 101-3 and 101-4 is disposed below the ISO mark 100 and displays the values of shutter speed, ISO data and the frame number of the film counter. A first set indication mark 102 of a triangular shape is disposed to the right of the numerical display part 101. A horizontal bar 103 is disposed below the numerical display part 101. The bar 103 is displayed when the main switch SM is turned on and de-energized when the main switch SM is turned off. Below the bar 103 are a second numerical display part 104 having two digit display elements 104-1, 104-2 and a decimal point 104-3, a character F and a square shaped mark 105 including symbols + and −. The second numerical display prt 104 displays the values of the diaphragm aperture and exposure adjustment. A second set indication marks 106 is disposed to the right of the second numerical display part 104. The symbols + and − are displayed when an exposure compensation i.e., the override is set in the camera.

Figure 4:
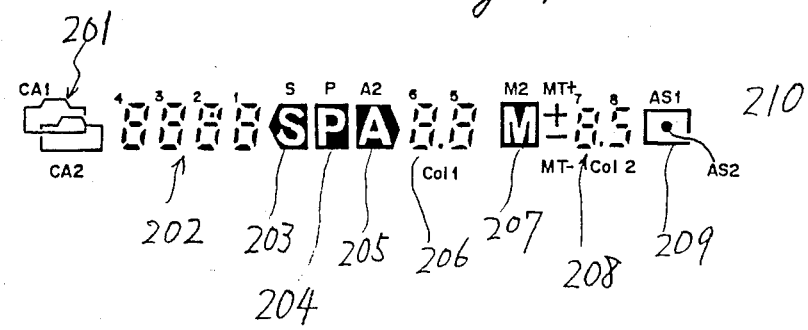
FIG. 4 is a front view showing an example of arrangement of display segments used in the internal display unit shown in FIG. 2.

FIG. 4 shows the detailed arrangement of the internal display unit 6. A blur warning display part 201 is formed by a pair of marks CA1 and CA2. A third numeric display part 202 having four digit display elements is disposed right to the camera shake display part 201 and displays the data of the shutter speed, ISO sensitivity and the frame number of the film counter. Marks 203, 204 and 205 with the characters S, P and A which respectively represent the S, P and A modes are disposed to the right of the third numerical display part 202. A fourth numerical display part 206 having two digit display elements is disposed right to the mark 205, and displays the value of the diaphragm aperture. The mark 203 has a tapered shape portion directed to the third numerical display part 202 so as to show that the shutter time is preferentially set. The mark 205 has a tapered portion directed to the fourth numerical display part 206 so as to show that the diaphragm aperture is preferentially set. Further the internal display unit 6 contains a mark 207 with a character M for displaying the M mode, a fifth numerical display part 208 having symbols + and − and two digit display elements for displaying either the data of the exposure compensation value in the automatic exposure control mode, i.e., P, A and S modes and the value of deviation set in the metered manual operation in the M mode. A mark 209 of a square shape and a dot 210 is disposed at the rightmost portion of the internal display unit 6 for displaying two kinds of light measurement. In case of an average light measurement, only the square shape mark 209 is displayed. In case of a partial or spot light measurement, both of the mark 209 and the dot 210 are displayed.

The character M with the fifth numeric display part 208 in the internal display unit 6 are provided for facilitating recognition of the metered manual mode since the metered manual mode display of the symbols +/− are displayed.

FIGS. 35 (a) and (b) and FIGS. 36 (a) and (b) show examples of display on the external display unit 4 and internal display unit 6 when the exposure compensation mode is set. It is noted that the position of the exposure compensation value displayed in the internal display unit 6 during the exposure compensation (+/−) mode is different from the position during the AE mode so that the exposure compensation value can be displayed at the central part of the display in the internal display unit 6 in order that the operator can easily read the override value during the exposure compensation mode.

Figure 5:
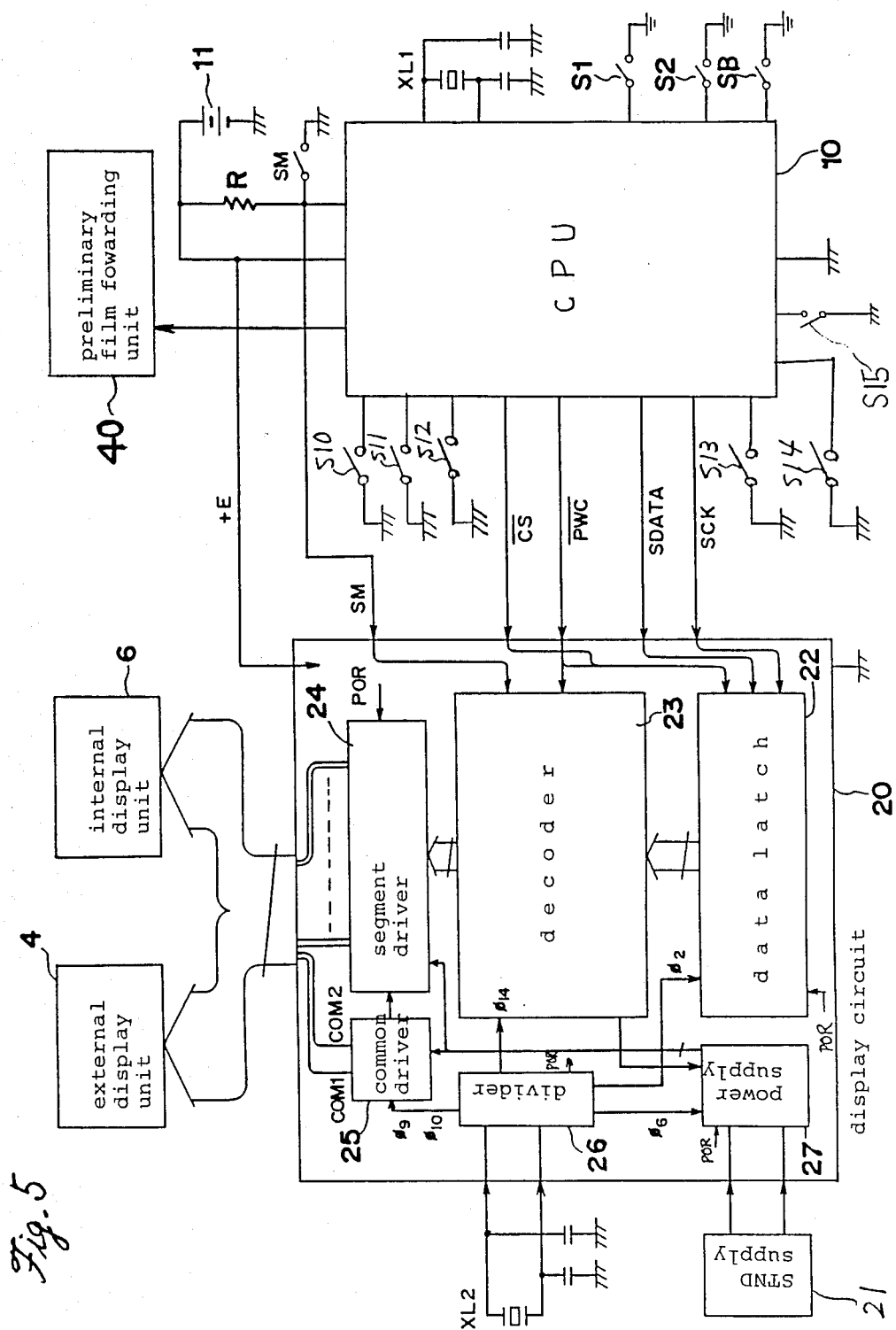
FIG. 5 is a block diagram used in the display device according to the present invention.

FIG. 5 shows a circuit diagram of a control device for controlling the display device mentioned above.

A central processing unit 10 (CPU) made of a microprocessor for controlling the camera operation is fed with a DC power at a potential +E from a battery 11 loaded in the camera. The main switch SM has it one terminal grounded and another terminal connected to the CPU directly and to the battery 11 through a pull-up resistor R. The CPU 10 is coupled with a crystal oscillating element XL1 for a standard clock pulse train.

Connected to the CPU 10 are a preview switch S10 for checking the depth of field, switches S11 and S12 for shifting the program predetermined in the P mode, a switch S13 for selecting the exposure control mode and a switch S14 for setting the exposure adjustment value. The switches S10 to S14 are respectively operable by the push buttons PB1 to PB5. A switch S15 for detecting an interchangeable lens attached to the camera is also connected to the CPU 10. The switch S15 is operated when the interchangeable lens is successfully attached to the camera.

A preliminary film forwarding unit 40 is coupled to the CPU 10 for forwarding the photographic film by several frames during the initial loading of the photographic film.

A display circuit 20 is supplied with DC power from the battery 11 and is adapted to receive the signal from the main switch SM and the signals $\overline{CS}$, $\overline{PWC}$ SDATA and SCK from the CPU 10. Also the display circuit 20 is coupled with a crystal oscillating element XL2 for standard clock pulses. A standard voltage generator circuit 27 in the display circuit 20 receives voltages from a voltage source 21 and generates a standard voltage for driving the liquid crystal display elements (LCD) of the external display unit 4 and internal display unit 6. The outputs of the display circuit 20 are supplied to the external display unit 4 and the internal display unit 6.

The display circuit 20 comprises a data latch 22 for latching the various data sent from the CPU 10, a decoder 23 for decoding the data from the data latch 22, a segment driver 24 for supplying driving signals to the respective segment electrodes of LCDs, a common driver 25 for supplying driving signals common drive voltage to the common electrodes of LCDs, and a divider 26 for dividing the clock pulses of the oscillating element XL2.

Figure 6:
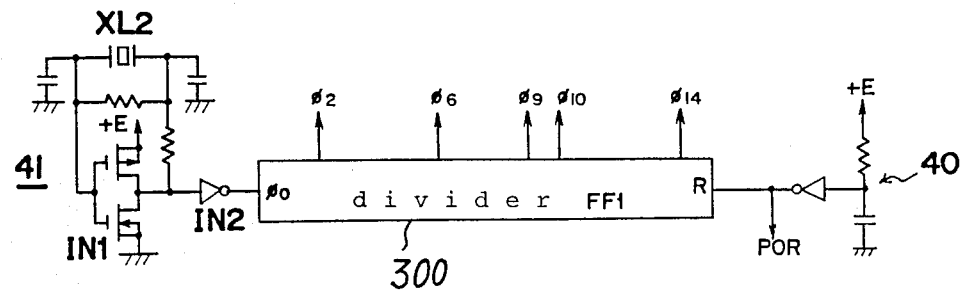
FIG. 6 is a circuit diagram showing the divider circuit shown in FIG. 5.

FIG. 6 is a circuit diagram around the divider 26. In the Figure, an oscillator circuit 41 is formed by the crystal oscillating element XL2 and an inverter IN1 and generates a basic clock pulses. A frequency divider circuit 300 is composed of multi stage flip flops for dividing the frequency of the basic clock pulses $\phi 0$ to pulses $\phi 2$, $\phi 6$, $\phi 9$, $\phi 10$ and $\phi 14$ each having $\frac{1}{4}$, 1/64 1/512 1/1024 and 1/16,384 of the frequency of the basic clock pulse. The flip flops of the frequency divider circuit 300 are reset by a power on reset signal POR fed to the terminal R when the battery 11 is replaced.

Figure 7:
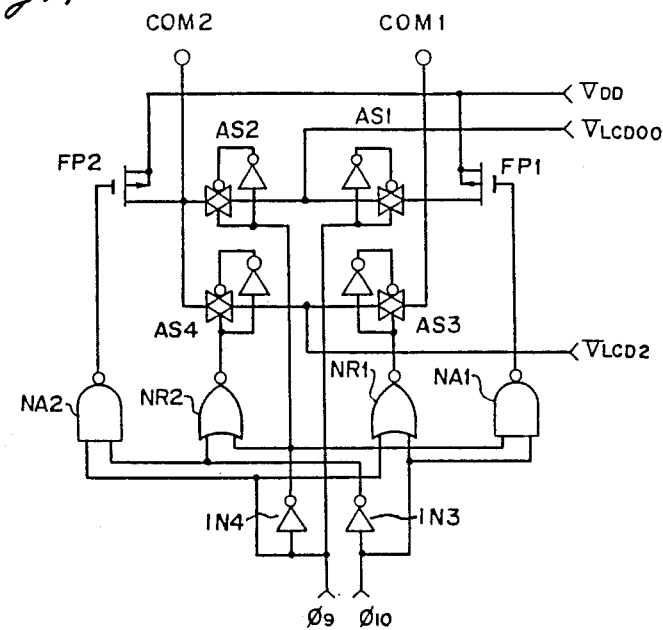
FIG. 7 is a detailed circuit diagram showing a common driver circuit shown in FIG. 5.

FIG. 7 shows the details of the common driver 25. The circuit 25 receives the voltages $V_{LCD0}$, $V_{LCD2}$, and $V_{DD}$ and output the voltage to the output terminals COM1 and COM2 through analog switches AS1 to AS4 and p channel field effect transistors (FET) FP1 and FP2 by the timing pulses $\phi 9$ and $\phi 10$. The timing of outputting the voltages $V_{LCD0}$, $V_{LCD2}$ and $V_{DD}$ is defined by NAND gates NA1 and NA2, NOR gate NOR1 and NOR2 and inverters IN3 and IN4.

Figure 8:
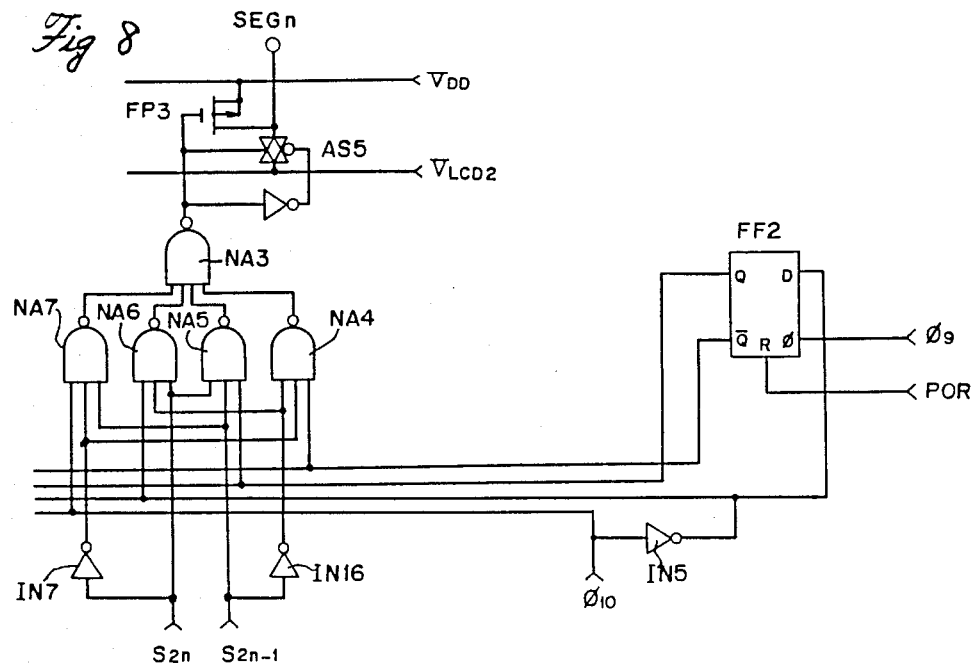
FIG. 8 is a detailed circuit diagram showing a part of a segment driver shown FIG. 5

FIG. 8 shows the details of a part of the segment driver 24 for one segment of the LCD display element. The circuit is so arranged as to drive a p channel FET FP3 and an analog switch AS5 in accordance with the timings of the pulses $\phi 9$ and $\phi 10$ and segment selection signals $S2n$, $S2_{n-1}$, causing alternatively output of voltages $V_{LCD2}$ and $V_{DD}$. NAND gates NA3 to NA7 and inverters IN6 and IN7 form a clock selector for selecting the pulses $\phi 9$ and $\phi 10$ corresponding to the segment selection signals $S_{2n}$ and $S_{2n-1}$. An inverter IN5 and a flip flop FF2 form a clock generator for outputting four kinds of clock pulses having phase differences as shown in lowest four waves in FIG. 30 from the pulses $\phi 9$ and $\phi 10$. All parts of segment driver 24 for driving in segments of the LCD are formed with one clock generator and n circuit arrangements including the clock selector, analog switch and FET shown in FIG. 8.

Figure 9:
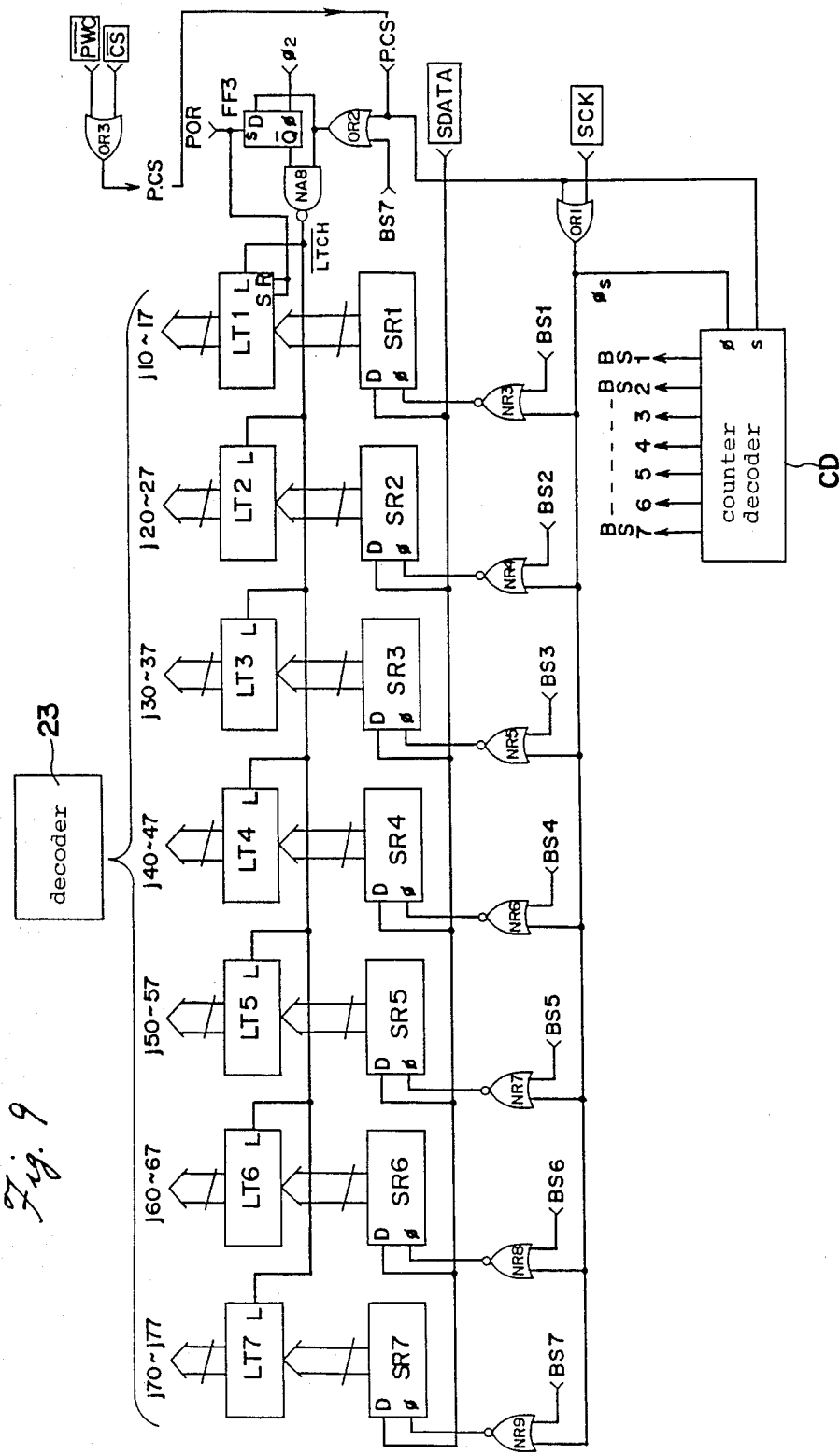
FIG 9 is a block diagram showing a data latch shown in FIG. 5.

The details of the data latch 22 are shown in FIG. 9. Seven shift registers SR1 and SR7 each having eight bit stages are adapted to receive the serial data SDATA from the CPU 10. The parallel outputs of the respective shift registers SR1 to SR7 are coupled to latches LT1 to LT7 each having eight bits, storing the data upon application of positive edge of the signal $\overline{LTCH}$. The input terminal corresponding to the output terminal j10 of the latch LT1 is supplied with the reset input R and the input terminal corresponding to the output terminal j11 is supplied with the set input S so that the data of the output terminals j10 and j11 are set and reset by the power on reset signal POR. In the initial state the data of the terminals j10 is Low and j11 is High.

The serial clock pulses SCK passes an OR gate OR11 and is applied to NOR gates NR3 to NR9 as the signal $\phi s$. The signal $\phi s$ is also applied to a clock terminal $\phi$ of a counter decoder CD. When a set terminal s of the counter decoder CD is High, the outputs BS1 to BS7 of the counter decoder CD are all High. When the set terminal s is Low, one of the output terminals BS1 to BS7 is made Low sequentially each time eight pulses are applied to the terminal $\phi$. When one of the terminals BS1 to BS7 is Low, one of the NOR gates NR3 to NR9 can be enabled correspondingly to pass the signal $\phi s$ to the input terminal $\phi$ of the corresponding shift register SRi (i=1 to 7).

External control signals $\overline{PWC}$ and $\overline{CS}$ are logically summed in the OR gate OR3 to generate the signal P.CS, which is applied to one input terminal of the OR gate OR1 and s terminal of the counter decoder CD. The signal P.CS is applied to one input terminal of the OR gate OR2 in which the signal P.CS is logically summed with the signal BS7. The output of the OR gate OR2 is applied to the D input of a flip flop FF3 and the one input terminal of a NAND gate NA8. The flip flop FF3 receives the power on reset signal POR at its S input terminal and the $\overline{Q}$ output is applied to another input terminal of the NAND gate NA8. The clock pulses $\phi 2$ is applied to the $\phi$input of the flip flop FF3.

Figure 10:
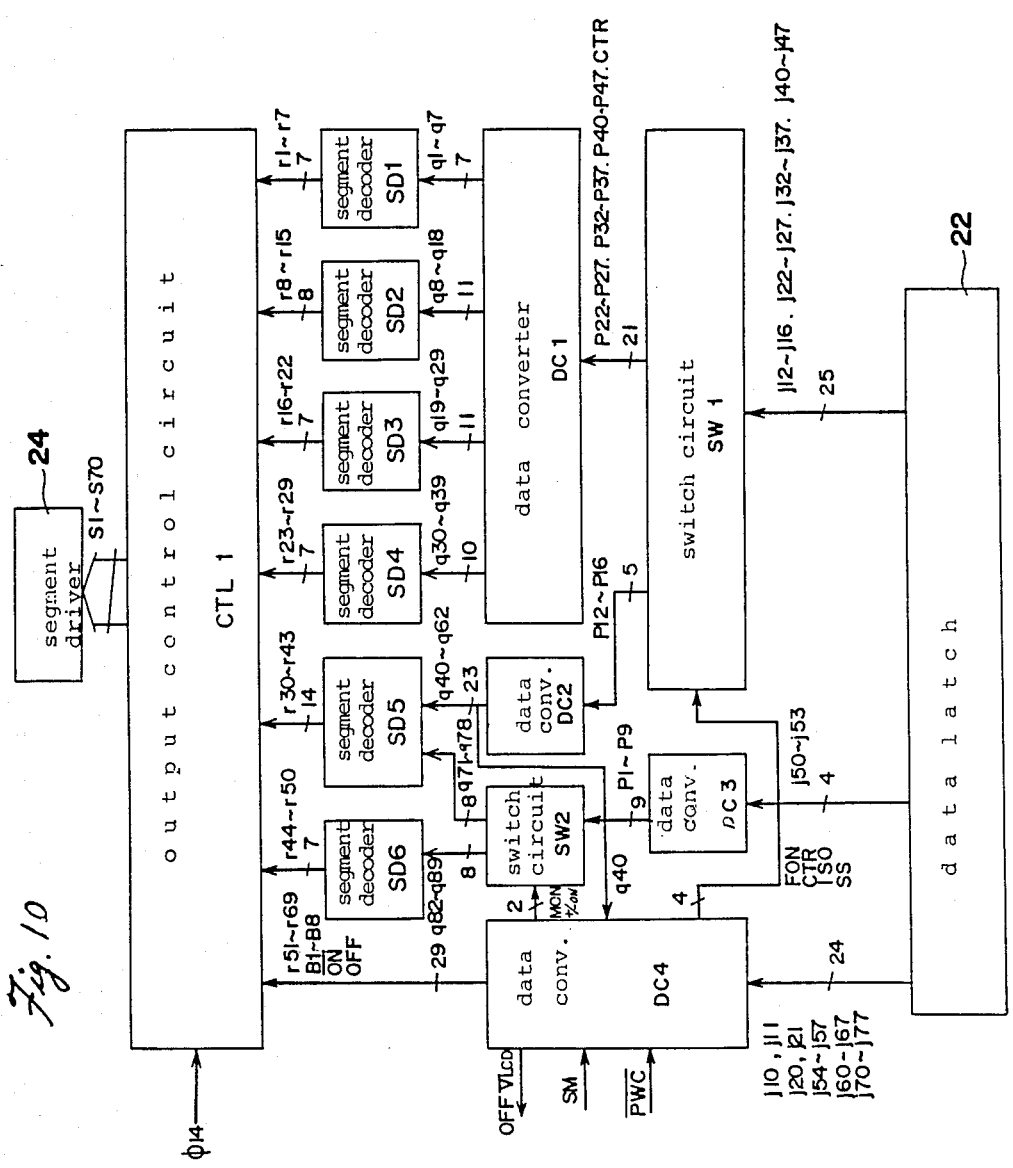
FIG. 10 is a block diagram showing a decoder shown in FIG. 5.

FIG. 10 shows the details of the decoder 23 composed of switch circuits SW1 and SW2, data converters DC1 to DC4, segment decoders SD1 to SD6 and an output control circuit CTL1. The switch circuit SW1 is connected with the lines corresponding to the output terminals j12 to j16, j22 to j27, j32 to j37 and j40 to j47 of the data latch 22. The data converter DC4 is connected with the lines corresponding to the output terminals j10, j11, j20, j21, j54 to j57, j60 to j67 and j70 to j77 of the data latch 22. The signals SM of the main switch and $\overline{PWC}$ are applied to the data converter DC4.

The output p22 to p27, p32 to p37, p40 to p47 and CTR corresponding to the output terminals j22 to j27, j32 to j37 and j40 to j47 of the data latch 22 are applied to the data converter DC1. The outputs q1 to q7, q8 to q18, q19 to q29 and q30 to q39 are respectively applied to the output control circuit CTL1 through segment decoders SD1 to SD4.

The outputs p12 to p16 of the switch circuit SW1 corresponding to the output terminals j12 to j16 of the data latch 22 are applied to the data converter DC2 of which outputs are applied to the output control circuit CTL1 through the segment decoder SD5.

The outputs j50 to j53 of the data latch 22 are applied to the data converter DC3 of which outputs are applied to the control circuit CTL1 through the switch circuit SW2 and the segment decoder SD6.

The output control circuit CTL1 is supplied with the clock pulses $\phi 14$ and the outputs of the control circuit CTL1 are connected to the segment driver 24.

Figure 11:
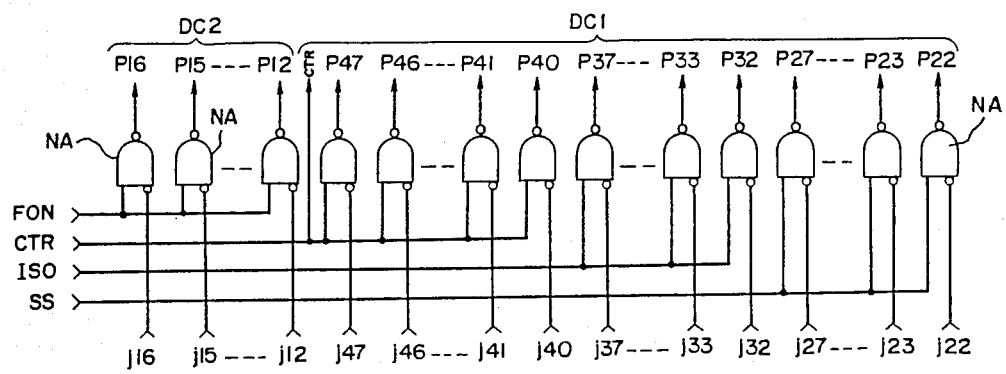
FIG. 11 is a circuit diagram showing an example of a switch circuit shown in FIG. 5.

FIG. 11 shows the details of the switch circuit SW1 shown in FIG. 10. There are 25 NAND gates NA having their one input terminals connected with the outputs j12 to j16, j22 to j27, j32 to j37 and j40 to j47 of the data latch 22 with other input terminals adapted to receive the signals FON, CTR, ISO and SS as shown in FIG. 11 respectively.

The output terminals p12 to p16 are connected with the data converter DC2 and the output terminals p22 to p27, p32 to p37 and p40 to p47 are connected with the data converter DC1.

In the circuit of FIG. 11, when the signal FON is Low, the signals from the output terminals j12 to j16 are not passed to the outputs p12 to p16, but when the signal FON is High, the signals from the output terminals j12 to j16 are passed to the outputs p12 to p16. The same operation as mentioned above can be performed for the signals CTR, ISO, and SS.

Figure 12:
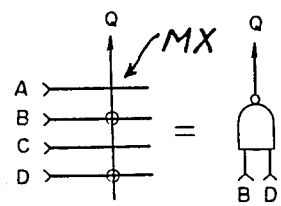
FIG. 12 is a circuit diagram showing the symbol used in the circuits shown in the Figures.

FIG. 12 explains the symbols used in FIGS. 13, 14, 15, 16, 17 and 26.

In FIG. 12, A, B, C and D are input lines and Q is an output line. The circles on the intersecting points of the input lines B and D and the output line Q denote a NAND gate having inputs B and D as shown in the right hand of FIG. 12. The logic of the matrix with the circles on the lines B and D represents $\overline{B}/ = Q$.

Figure 13:
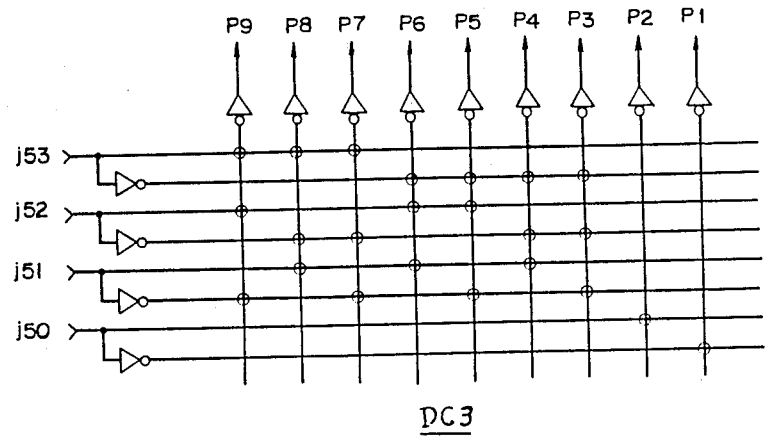
FIG. 13 is a circuit diagram showing the detailed arrangement of a data converter shown in FIG. 5.

FIG. 13 represents the details of the data converter DC3 shown in FIG. 10. The circuit of FIG. 13 shows logic of the outputs p1 to p9 with respect to the inputs j50 to j53.

Figure 14:
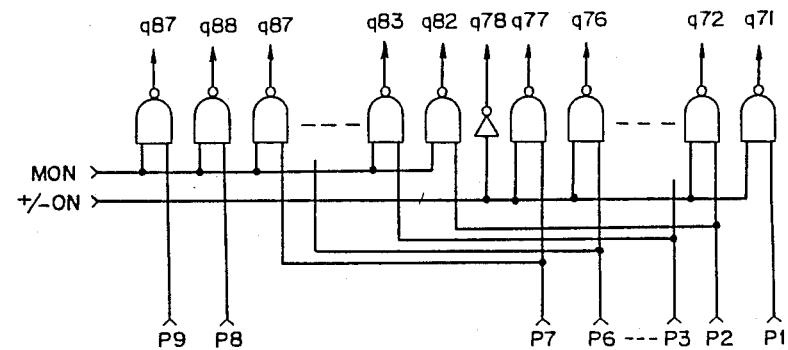
FIG. 14 is a circuit diagram showing another switch circuit shown in FIG. 5, FIGS. 15 to 17 are circuit diagrams showing a segment decoder shown in FIG. 10

FIG. 14 shows the details of the switch circuit SW2 in which the inputs p1 to p9 are outputted to the terminals q71 to q78, q82 to q89 by the switching signals MON, and $+/-$ ON.

When switching signal MON is Low, the output terminals q82 to q89 are High, which means the input signal is cut off, and when the switching signal MON is High, the output terminals q82 to q89 become equivalent and the input signal is passed to the corresponding output terminal.

The same operation can be made about the signal $+/-$ ON.

Figure 15:
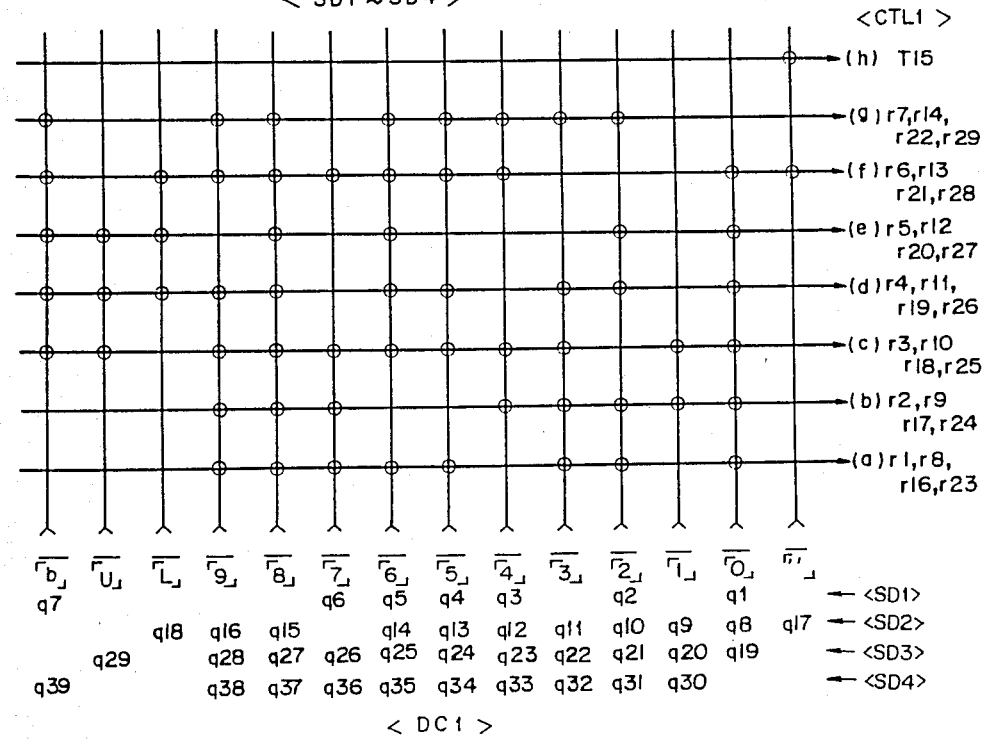

FIG. 15 shows the details of the segment decoders SD1 to SD4 showing the logic between the outputs r1 to r29 and the inputs q1 to q39.

It is noted that the basic arrangement of the segment decoders SD1 to SD4 is equivalent, therefore they are shown in one drawing. The respective decoders SD1 to SD4 can be formed by picking out the necessary parts of the arrangement of FIG. 15.

Figure 16:
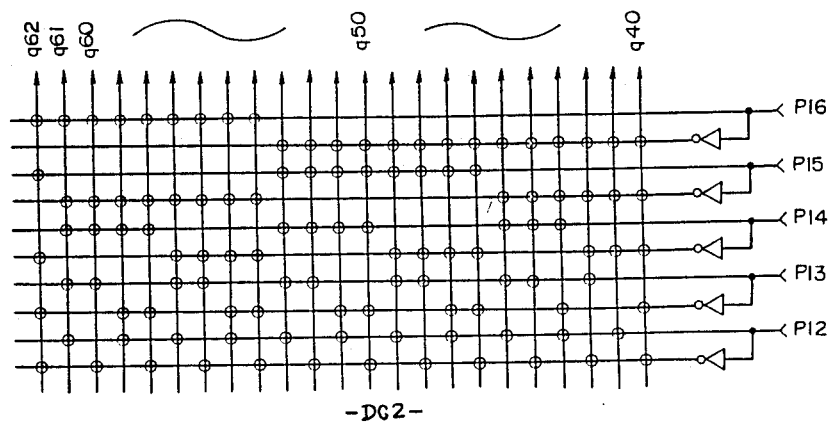

FIG. 16 shows the details of the data converter DC2, showing the logic between the outputs q40 to q62 and the inputs p12 to p16.

Figure 17:
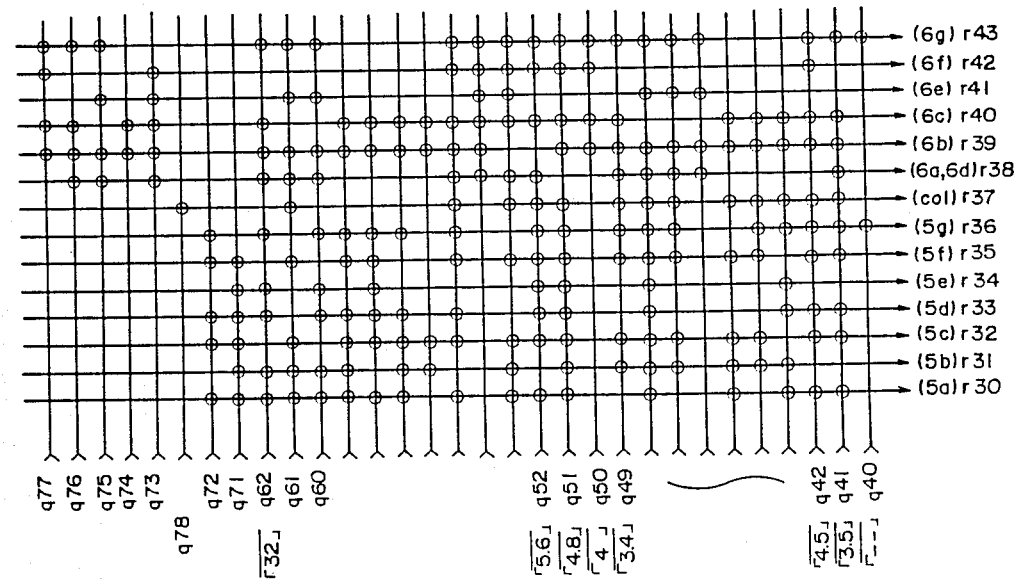

FIG. 17 shows the details of the segment decoder SD5 showing the logic between the outputs r30 to r43 and the inputs q40 to q62, q71 to q78.

Figure 18:
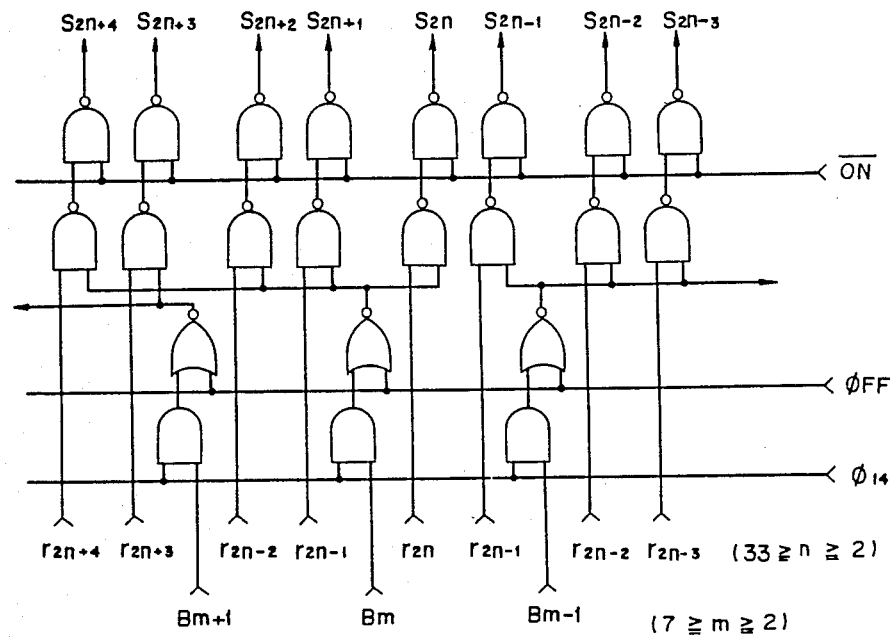
FIGS. 18 and 19 are circuit diagram showing an output control circuit shown in FIG. 10

FIG. 18 shows the details of a part of the output control circuit CTL1, in which the outputs S1 to S70 can be obtained by the outputs of the segment decoders SD1 to SD6, the data converter DC4 and the clock pulse $\phi 4$.

The truth table of the circuit of FIG. 18 is shown in the table 1.

Figure 19:
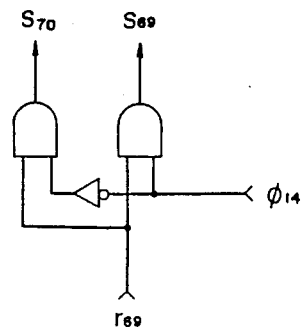

Table 1 is the truth table of the circuit arrangement shown in FIG. 18. In the table 1, the logic circuit is represented by a logical equation. Also, the relationship between the value r2n and Bm is shown in the specific forms. FIG. 19 (b) represents for the cases $1<m<8$, $1<2n<68$ with r69.

FIG. 19 shows the logic between the outputs s69 and s70 and the input r69.

FIG. 20 shows the relation between the outputs q1 to q39 of the data converter DC1 and the characters displayed on the external display unit 4 and the internal display unit 6. The characters can be displayed in such a manner that when the output q1 of the data converter DC1 is High, the numerical character displayed on the place of 10° digit of the display unit 4 (and 6) is 0, and with q1 Low of 10° becomes blank. With High q2 10° digit displays 2, and when q2 is Low the 10° digit becomes blank.

The data concerning shutter speed SS can be supplied to the input terminals p22 to p37. ISO data can be supplied to the input terminals p32 to p37. CTR value can be supplied to the input terminals p40 to p47 and the signal CTR.

When all of the terminals p22 to p27, p32 to p37 and p40 to p47 are High, none of the data is displayed.

Accordingly, when the data of the shutter speed SS is outputted, the data converter unit DC4 and the switch circuit SW1 are so arranged that the outputs p32 to p37, p40 to p47 are all High.

The contents which can be displayed on the display unit 4 and 6 are shown in FIG. 21. As understood from FIG. 21, any one of thirty-six shutter speeds, thirty-one ISO values and 100 film counter values can be displayed.

FIGS. 22 and 23 show the relation between the output data of the data converter DC2 and switch circuit SW2 and the characters displayed on both display units 4 and 6.

As shown, the outputs from the terminals q40 to q62, q71 to q78 and q82 to q89 change in accordance with the states of the signals on the input terminals p12 to p16 of the data converter DC2, the signals on the input terminals t1 to p9 of the switch circuit SW2, and the signals MON and $+/-$ ON.

The diaphragm aparture values are obtained by the signals on the input terminals p12 to p16. Exposure compensation values and the exposure deviation values are obtained by the signals on the input terminals p1 to p9.

Figure 24:
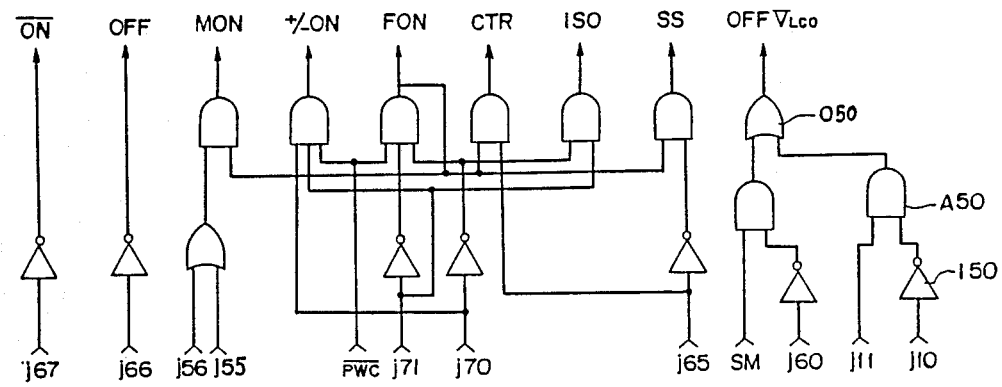
FIGS. 24 to 26 are circuit diagrams showing the data converter shown in FIG. 10

FIG. 24 shows the details of a part of the data converter DC4, showing the logic processing for obtaining the switching signals MON, +/− ON, FON, CTR, ISO and SS used in the switch circuits SW1 and SW2, $\overline{ON}$ and OFF signal for the output control circuit CTL1 and OFFVCLD signal for the voltage generator circuit 27. The input signals to the data converter DC4 are j10, j11, j55, j56, j60 to j67, j70, j71 and the external signals SM and PWC.

Figure 25:
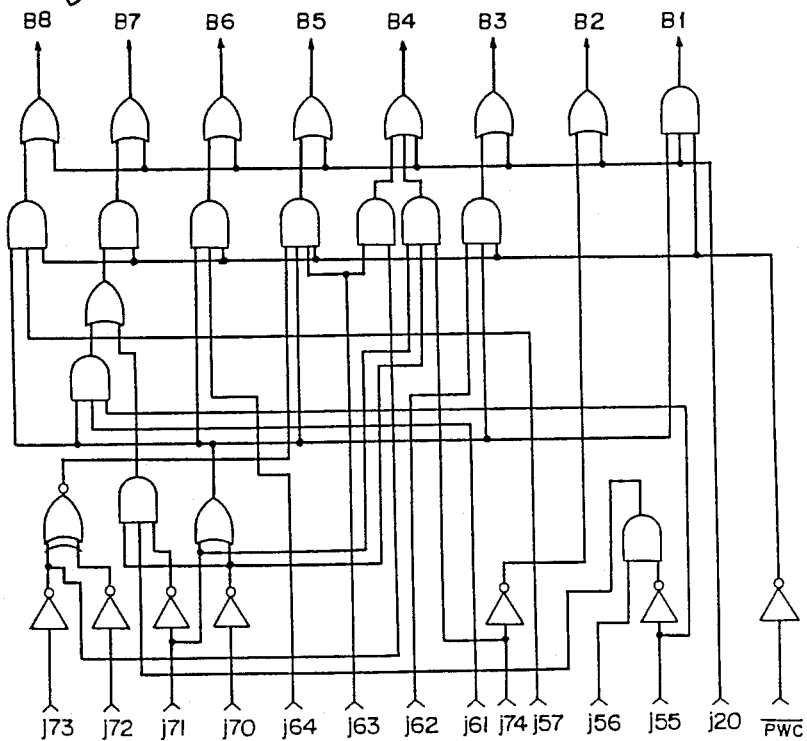

FIG. 25 shows the details of a further part of the data converter DC4, showing the logic processing for obtaining the signals B1 to B8 for use in the output control circuit CTL1 by the input signals j20, j55 to j57, j61 to j64, j70 to j74 of the data latch 22 and the external signal $\overline{PWC}$.

Figure 26:
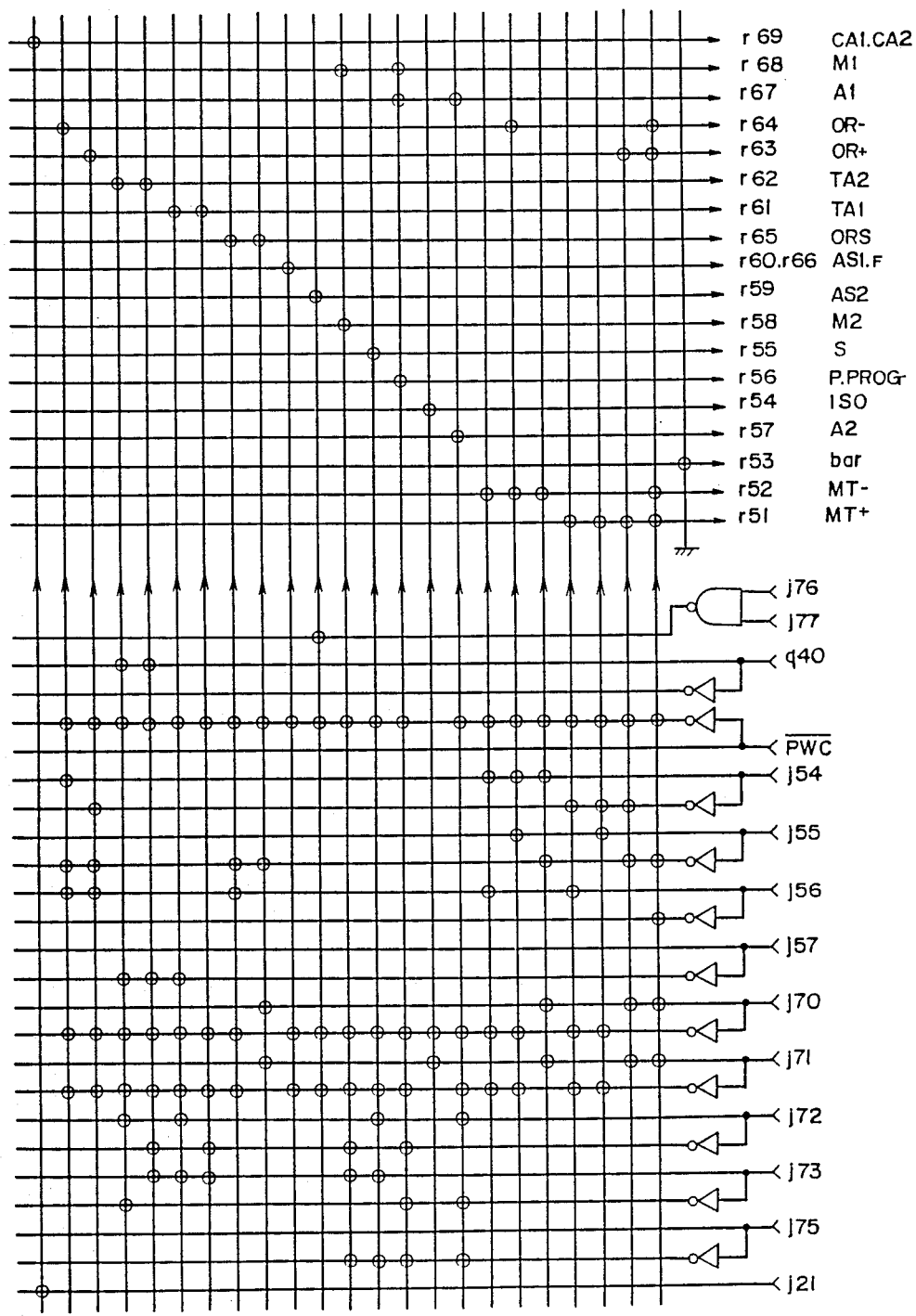

FIG. 26 shows the details of a still further part of the data converter DC4, showing the logic processing for obtaining the signals r51 to r69 used in the output control circuit CTL1 by the input signals j21, j54 to j57, j70 to 73, j75 to j77 of the data latch 22, output signals q24 of the data converter DC2 and the external signal $\overline{PWC}$.

Figure 27:
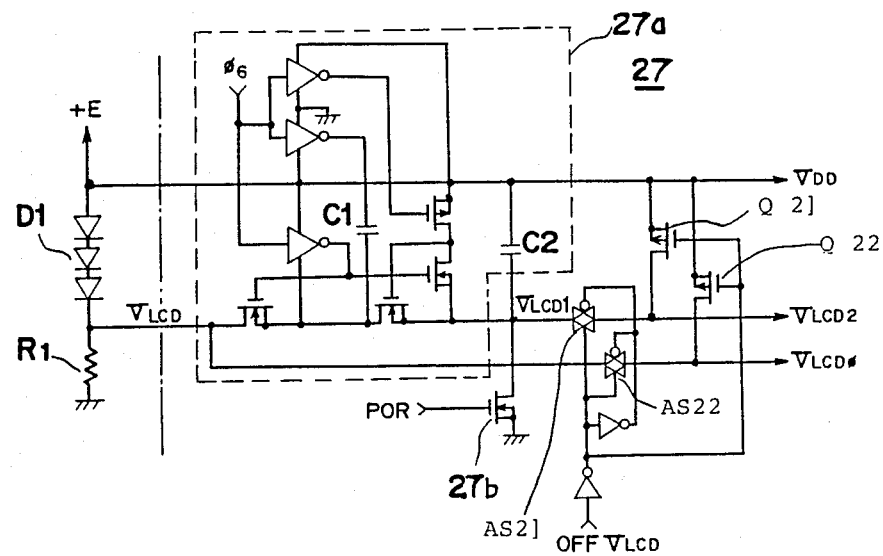
FIG. 27 is a circuit diagram showing an example of a voltage generator circuit shown in FIG. 5, FIGS. 28 to 30 are schematic diagrams showing various waveforms of the essential portions of the voltage generator circuit.

FIG. 27 shows the details of the voltage generator circuit 27. A reference voltage VLCD is obtained by dividing the voltage +E by the circuit formed by diodes D1 and a resistor R1 provided exterior of the generator 27. The reference voltage VLCD is fed to a booster 27a comprising capacitors C1 and C2, so as to generate a multiplied voltage (+E−VLCD1) of a voltage (+E−VLCD). The voltages VLCD and VLCD1 are introduced output terminals VLCD0 and VLCD2 through an output control circuit formed by analog switches AS21, AS22 and FETs Q21 and Q22.

The terminals VLCD0 and VLCD2 respectively change their state in such a manner that when the signal OFFVLCD is Low, the terminal VLCD0 is VLCD and VLCD2=VLCD1, and when the signal OFFVLCD is High, both terminals VLCD0 and VLCD2 assume voltage VDD.

In the booster 27a, the capacitors C1 and C2 are switched by the clock pulse φ6 to increase the voltage from VLCD to VLCD1. The booster 27a starts its operation upon receiving the signal POR.

Figure 29:
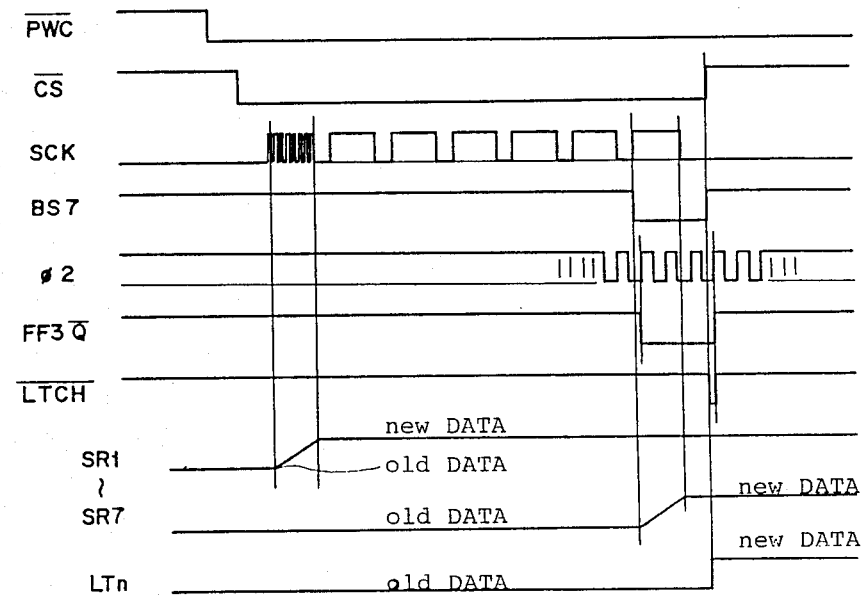

FIG. 29 shows the time chart of the operation of the data latch 22.

The contents of the registers SR1 to SR7 can be updated from the old data D(old) to the new data D(new) by the negative edges of every pulse SCK while the signals PWC* and CS* are Low.

More specifically, the update of the contents of the register SR1 is completed at the negative edge of the first 8th pulse of SCK.

The register SR2 is updated by the 9th to 16th pulses of SCK.

In the same manner as described above the respective registers SR3 to SR7 are updated by the pulses of SCK.

At the positive edge of 49th pulse of SCK just after the update of the register SR6 is completed, in addition to the start of update of the register SR7, the $\overline{Q}$ output of the flip flop FF3 is changed to Low state which is kept until the signal BS7 become High in order to read in the D input by the positive edge of the clock pulse φ2.

The pulse $\overline{LTCH}$* is generated by the $\overline{Q}$ output of the flip flop FF3 and P.CS signal, then the contents of the registers SR1 to SR7 are transferred to the latches LT1 to LT7.

Figure 28:
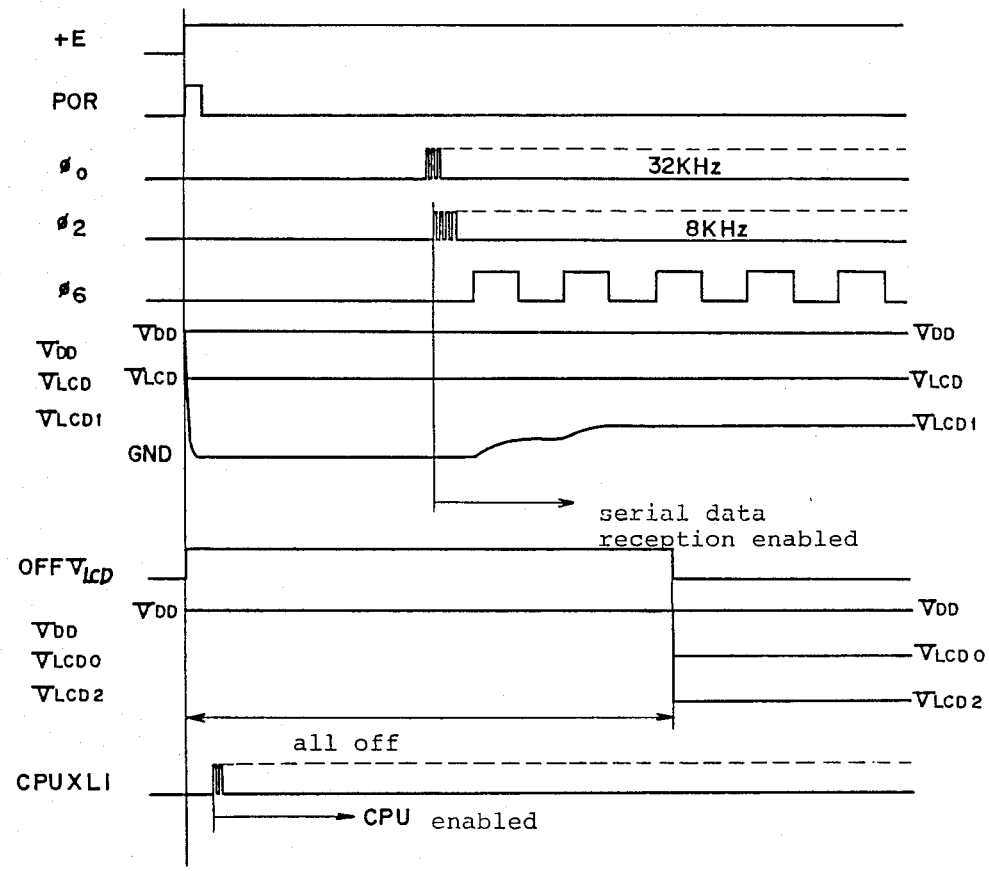

FIG. 28 shows the time chart of the outline of the operation of the camera after the battery 11 is mounted in the camera.

When the battery 11 is mounted in the camera, the display circuit 20 is initialized by the signal POR. The terminal VLCD1 is grounded with the signal OFFVLCD made High, whereby no voltage is applied to the display units 4 and 6. Thereafter the oscillator XL1 starts oscillation to start the CPU 10. After a predetermined period of start of the CPU 10, the oscillator XL2 starts oscillation, then the clock pulses φ0 to φ14 are generated.

When the clock pulse φ2 is generated, the data latch 22 starts and the operation explained with reference to FIG. 29 can be performed if the serial data is applied from the CPU 10. With the generation of the clock pulse φ6, the voltage generator 27 starts and the voltage VLCD1 is stabilized after a short time has lapsed.

After the voltage is stabilized, the voltages VLCD0 and VLCD2 for driving the LCD elements of the display units 4 and 6 can be fed upon application of the signal OFFVLCD of Low.

FIGS. 31a, 31b through FIGS. 44a, 44b show the various features of the external display unit 4 and internal display unit 6. The respective Figures labeled by (a) represent the display on the external display unit 4 and in Figures labeled by (b) represent the display on the internal display unit 6.

FIGS. 31a and 31b show the display under the P mode.

In the external display unit 4, the character PROGRAM for the P mode is displayed. In the example shown, the number 250 for the shutter speed 1/250 is displayed by the display unit 101. Also the bar 103 is displayed. F5.6 are displayed by the display part 104 for the diaphragm aperture value.

In the internal display unit 6, the number 250 for the shutter speed, the character P surrounded by a square or the P mode, and 5.6 for the diaphragm aperture value are displayed.

In the example shown in FIG. 31 (b) the mark 209 represents the average light measuring.

FIGS. 32(a) and 32(b) show the feature of the display under the A mode. The character A is displayed to show the A mode. The aperture setting mark 106 is also displayed right to the character F5.6. In the internal display unit 6 the character A surrounded by the mark 205 of a pentagon is displayed to show the A mode.

FIGS. 33(a) and 33(b) show the display under the S mode. In this case, the shutter time setting mark 102 is displayed with the number 250 of the set shutter time 1/250, 5.6 of the automatic diaphragm aperture value and the character S and S 203 for representing the S mode.

FIGS. 34(a) and 34(b) show the display under the M mode. The setting marks 102 and 106 are displayed on the external display unit 4 right to the numbers 8" for the set shutter time and 1.4 for the set diaphragm aperture value. The character M is displayed to represent the M mode.

In the internal display unit 6, the character M surrounded by the square mark 207 is displayed. In this example, the spot light measuring marks 209 and 210 are displayed in the rightmost position. The number +6.5 left to the mark 209 represents the exposure deviation value which indicates that exposure is set 6.5 stops more required for a correct exposure value.

Also, the camera shake warning mark 201 is displayed at the leftmost position. In order to warn of camera shake, the marks CA1 and CA2 are turned on and off alternately.

FIGS. 35(a) and 35(b) show the display during the setting of the exposure adjustment value.

The symbol + represents the direction of the exposure adjustment and the number 1.5 represents its absolute EV value.

FIGS. 36(a) and 36(b) show the display after the exposure compensation is set. The mark + is only displayed in the external display unit 4. The value +1.5 is displayed in the internal display unit 6 but is flashed or blinked.

Figures 37A, 37B, 38:
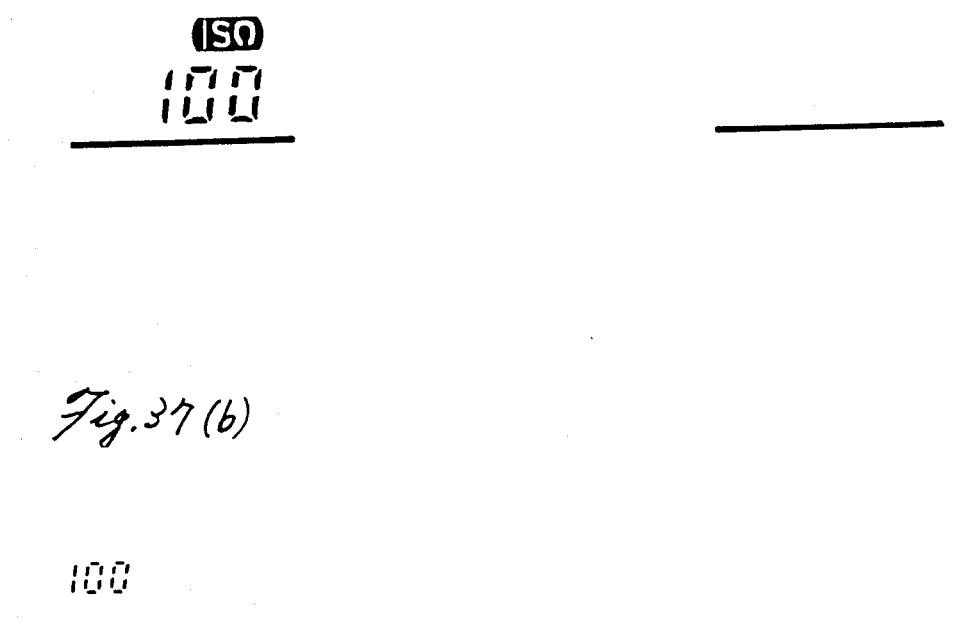

FIGS. 37(a) and 37(b) show the display during the setting of the ISO value. In this case, ISO mark 100 and ISO value (100) are displayed in the external display unit 4. Only the ISO value (100) is displayed in the internal display unit 6.

FIGS. 40 and 41 show the display of the camera shake warning. The marks CA1 and CA2 in the internal display unit 6 are turned on and off repeatedly and alternately, whereby the operator can see as if the marks CA1 and CA2 vibrate, so that the operator recognizes camera shake at a glance.

FIG. 38 shows the display on the external display unit 4 during the stand-by mode of the CPU10. Only the bar 103 is displayed. In this case, only the display units 4 and 6 are enabled and all other parts of the camera is disabled.

OPERATION

The operation of the display circuit 20 will be described hereinafter.

Upon application of the DC power from the battery 11, the flip flop FF1 (FIG. 6) of the frequency divider 26, the flip flop FF2 (FIG. 8) of the clock generator of the segment driver 24, the flip flop FF3 and the latch LT1 of the data latch 23, the starting FET 27b (FIG. 27) of the voltage generator 27 are respectively initialized by the power on reset pulse POR generated by the power on reset circuit 40. By the initialization, the terminals j10 and j11 of the latch LT1 are made Low and High and Q outputs of the flip flops FF1 and FF2 are made Low and High and $\overline{Q}$ outputs thereof are made High and Low.

In the voltage generator 27, FET 27b is turned on in a short period, so that the capacitor C2 is charged and the terminal VLCD1 is grounded.

In the state mentioned above, the crystal oscillator XL2 of the oscillator circuit 41 has not yet started to oscillate, therefore, the display circuit 20 waits the start of the oscillation of the crystal oscillator XL2 and the generation of the pulse $\phi 0$ without any circuit operation of the display circuit 20 keeping the initialized states of various parts of the circuit 20.

On the other hand, any one of the voltage VDD, VLCD2 or VLCD0 is applied to both of the external and internal display units 4 and 6 through the terminals COM and SEG. The voltage at the terminal COM1 is the voltage VLCD2. COM2 is VLCD0, SEGn is VDD or VLCD2 depending on the state of the signals S2n and S2n−1.) In this case, the voltage OFFVLCD applied to the voltage generator 27 is set to High by the Low signal of the terminal j10 and the High signal of the terminal J11 which are fed through the AND gate A50, inverter I50 and OR gate O50, then VLCD2=VLCD0=VDD can be obtained. Namely, the voltages applied to the respective electrodes of the LCD elements of the external and internal display units 4 and 6 are equal, so that application of a harmful DC voltage to the electrodes of the LCD elements is prevented.

When the crystal oscillator XL2 starts to oscillate and the clock pulse is fed to the frequency divider 300, the respective parts of the display circuit 20 start their operation.

The clock pulses $\phi 2$ are applied to the flip flop FF3 of the data latch 22 and serve to generate LTCH* pulse when the CPU 10 starts the communication of the serial data.

The clock pulses $\phi 6$ are supplied to the booster 27a of the voltage generator 27 and serve to switch the capacitors C1 and C2 to boost the input voltage.

The clock pulses $\phi 9$ and $\phi 10$ are applied to the segment driver 24 and common driver 25 in which both pulses are shaped suitably for driving the LCD display elements.

The clock pulses $\phi 14$ are applied to the output control circuit CTL1 of the decoder 23 and are used for causing the display units to be turned on and off repeatedly.

After the oscillation of the crystal oscillator XL2 is fully started, the terminal VLCD1 of the booster 27a is changed from the GND level to the level of (VDD−2VLCD) by application of the clock pulses $\phi 6$ to the booster 27a. Then the voltage of the terminal VLCD1 can be stabilized.

The booster 27a stays in operation as long as the power supply voltage VDD to the booster 27a is below a predetermined voltage or the oscillator stops its operation.

When the data decoder DC4 receives a signal from terminal j10 (except for Low) and the terminal j11 (except for High) from the data latch 22, the output OFFVLCD becomes Low) and the analog switches AS21 and AS22 are turned on thereby making VLCD2=VLCD1 and VLCD0=VLCD. The voltages VLCD2 and VLCD0 are applied to the common driver 25 and segment driver 24, in turn applied to the LCD elements of the external display unit 4 and internal display unit 6 so as to enable to display the various data latched in the data latch 22.

When the signals $\overline{PWC}$ and $\overline{CS0}$ are Low, the data latch 22 can be operated. The signal $\overline{PWC}$ is used as a timing signal for supplying the power source to the light measurement circuit of the camera. The light measurement circuit starts its operation with Low of $\overline{PWC}$ signal. The signal $\overline{CS}$ is used for determining the forwarding address of the serial data. The forwarding address of the serial data is determined when the $\overline{CS}$ is Low.

When any one of the signals $\overline{PWC}$ is High, the signal P.CS is High and the counter decoder CD is set to cause the all outputs BS1 to BS7 to be High. Also the output $\phi s$ of the OR gate OR1 and the output $\overline{LTCH}$ of the NAND gate NA8 are High respectively.

When $\overline{PWC}$ and $\overline{CS}$ are both Low, the counter decoder CD is brought into an operative condition and the OR gates OR1 and OR2 are opened, whereby the signals SCK and BS7 can be passed to the NOR gates NR3 to NR9 and the flip flop FF3 respectively.

The NOR gate NR3 is opened when the signal BS1 is Low at the time of the positive edge of the first SCK pulse. The input signal $\phi 0$ to the shift register SR1 is raised at the time of falling of the first SCK pulse, then the shift register SR1 takes one bit of the content of SDATA. The data is output from the terminal j10. When the second SCK pulse is applied, the shift register SR1 takes the second bit of SDATA. A similar operation as mentioned above is repeated for every bits of SDATA. At the negative edge of the 8th pulse of SDATA, eight bits of SDATA are taken in the shift register SR1 and the signal of 8th bit is output from the terminal j17. The signal BS1 is kept low while the above operation is performed.

When the 9th SCK pulse occurs the signal BS1 becomes High and BS2 becomes Low, the NOR gate NR3 is closed and the NOR gate NR4 is opened. At the negative edge of the 9th SCK pulse, the φ input of the shift register SR2 raises taking on bit of SDATA. The data taken in the register SR2 at this time is output from the terminal j20. An operation similar to that mentioned above is repeated. When the 49th SCK pulse is raised, the signal BS6 becomes High with BS7 being Low, then the NOR gate NR8 is closed and NR9 is opened. Further the output of the OR gate OR2 becomes Low. The shift register SR7 takes up to 56th SCK pulses. While the first to 56th SCK pulses are taken in the shift register SR1 to SR7, the signal $\overline{LTCH}$ is kept High, thus the latches LT1 to LT7 do not take the contents of the shift registers SR1 to SR7 in this period. In detail, although the output of the OR gate OR2 is made low by the 49th SCK pulse, the flip flop FF3 takes Low signal at D input by the positive edge of the clock pulse φ2, causing $\overline{Q}$ output to be High. However another input of the NAND gate NA8 is made Low earlier than the $\overline{Q}$ output of the flip flop FF3 becomes Low, thus signal $\overline{LTCH}$ is kept High. When the 57th SCK pulse occurs or any one of $\overline{PWC}$ or CS* becomes High, the output of the OR gate OR2 becomes High. Since the $\overline{Q}$ output of the flip flop FF3 which is another input of the NAND gate NA8 is High, the output of the NAND gate NA8 or the signal $\overline{LTCH}$ becomes Low. The negative edge of the signal $\overline{LTCH}$ causes the latches LT1 to LT7 to be triggered to take the outputs of the shift registers SR1 to SR7 in the latches LT1 to LT7. Subsequently, the flip flop FF3 takes the High signal of D input by the positive edge of the clock pulse φ2 and $\overline{Q}$ output of the flip flop FF3 is made Low. The counter decoder CD is set in the initial state by any one of High signal of $\overline{PWC}$ or $\overline{CS}$.

In the operation mentioned above, it is one advantage that even if a number of bytes of the clock pulses of the received serial data are missing the last latch pulse LTCH* is not outputted, whereby no failure of data occurs. It is a further advantage that even if the number of bytes of the clock pulses is too great, the data is cut off at the 57th SCK pulse automatically so that no accident occurs. It is a still further advantage that since the CPU 10 processes the data so that the clock pulses are not interrupted in every byte, any data transfer accident can be prevented.

In case there is any accident of the internal clock pulses φ2 under the normal condition of the external signals $\overline{PWC}$, $\overline{CS}$, SCK and SDATA, the signal $\overline{LTCH}$ can not be outputted, whereby the data stored in the shift registers SR1 to SR7 can not be transferred to latches LT1 to LT7. When such accident occurs, the wave form of the LCD driving signal becomes a straight line. In this case, terminal j10 is kept Low and j11 is kept High, thereby causing the signal OFFVLCD to be High to inhibit application of the driving voltage to the LCD elements. For this purpose, the external data is inhibited from being taken in the display circuit 20 when the clock pulse φ2 is not operated.

The detailed operation of the common driver 25 and the segment driver 24 is explained hereinafter.

Figure 30:
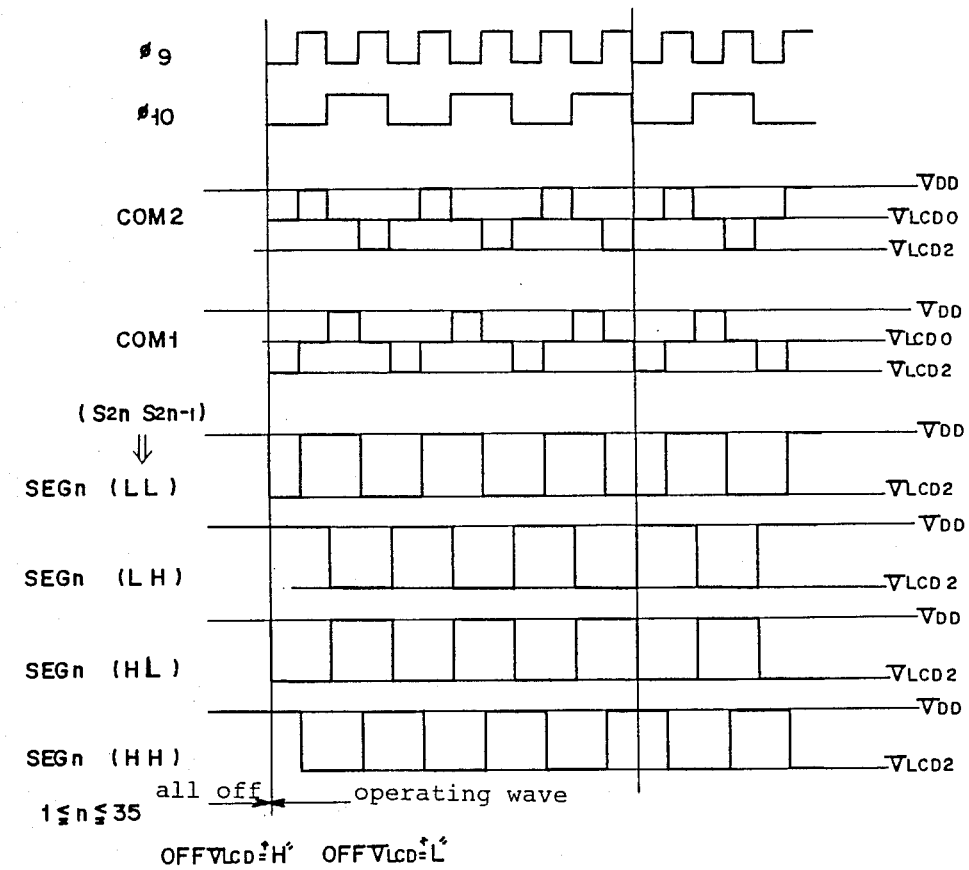
Figure 39:
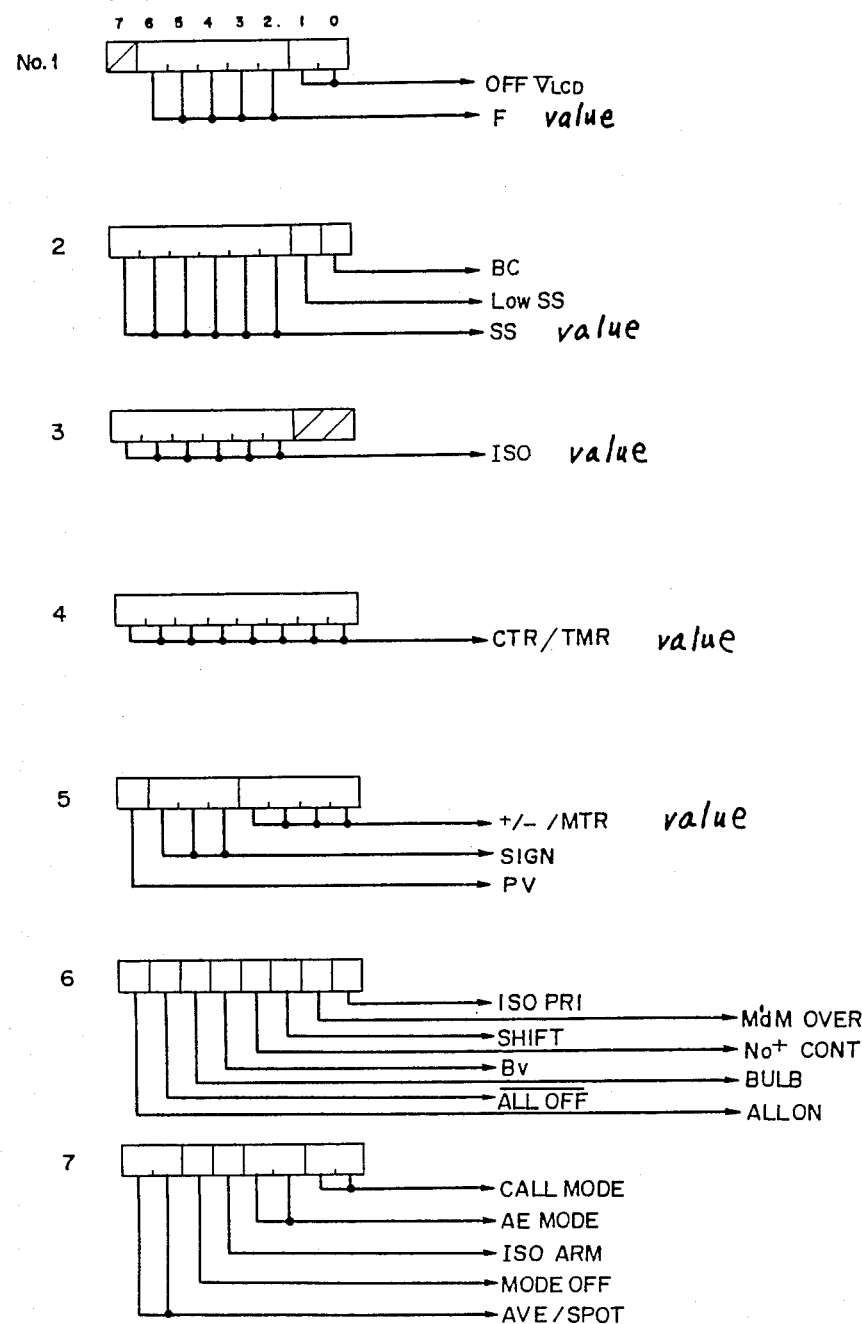
FIG. 39 is a schematic diagram showing various outputs of registers shown in FIG. 9, FIGS. 43, 44 and 46 are flowcharts showing the operation of the essential portion of the CPU shown in FIG. 5 according to the present invention, FIGS. 45 (a) to (c) are schematic diagrams showing a modification of a display to indicate camera shake.

Referring to FIGS. 7, 8 and 30, the analog switches AS1 to AS4, and the FETs of p channel FP1 and FP2, are turned on and off by the output signals generated by a gate circuit formed by the NAND gates NA1 and NA2, NOR gates NR1 and NR2 and inverters IN3 and IN4 controlled by the clock pulses φ9 and φ10 so as to produce the signals COM1 and COM2 of the common driver 25. The signals COM1 and COM2 are changed as shown in FIG. 30 synchronized with the clock pulses φ9 and φ10. The period of the outputs COM1 and COM2 is the same period of the clock pulse φ10 and the phase of the signals COM1 and COM2 is shifted by ¼ period. The signals COM1 and COM2 have three levels VDD, VLCD0 and VLCD2.

Referring to FIG. 8, four kinds of clock pulses are produced by processing the clock pulses φ9 and φ10 by a clock generator composed of the inverter IN5 and the flip flop FF2. The four kinds of clock pulses are selected by the NAND gates NA3 to NA7 on the basis of the signal S2n and S2n−1 to produce the segment signal SEGn. The segment signal SEGn has two levels VDD and VLCD2 with the period equal to the period of the clock pulse φ10. The phase of the signal SEGn can be changed by ¼ period as shown in FIG. 30 depending on the logic levels of Low or High of the signals S2n and S2n−1. The respective states of the signal SEGn corresponding to the level of the signals S2n and S2n−1 are expressed SEGn (L,L), SEGn (L,H), SEGn (H,L) and SEGn (H,H). The LCD elements of the display units 4 and 6 can be turned on in the displaying condition when the voltage difference between signals COM1 or COM2 and the signal SEGn is 2×VLCD2. For the signal COM1, the segment of LCD to which the segment signals SEGn (LH) or SEGn (HH) are applied can be turned on. For the signal COM2, the segment of LCD to which the segment signals SEGn (H,L) or SEGn (H,H) are applied on a turned on. When the segment signal SEGn (L,L) is applied, the segment is not turned on for both of the signals COM1 and COM2. The signal S2n−1 is used as the control signal of the segment of LCD receiving the signal COM1. The segment of LCD receiving the signal COM1 can be turned on when the signal S2n−1 is High and turned off when the signal S2n−1 is Low. The signal S2n is used as the control signal of the segment of LCD receiving the signal COM2. The segment receiving the signal COM2 is turned on when the signal S2n is High and turned off when the signal S2n is Low.

EXPLANATION OF THE SIGNALS j10 to j77

Referring to FIG. 9, the signals j10 and j11 are the control signals to control the supply of the LD drive voltage. When the signal j10 is Low and j11 is High, the supply of the LCD drive voltage is cut off.

The signals j12 to j16 are the data representing the diaphragm aperture values. When all of the signals j12 to j16 are high, no diaphragm aperture value is displayed.

The signal j20 is the signal relating to the warning of the exhausion of the battery 11. When the signal j20 is High, all displays on the display units 4 and 6 are turned on and off with the frequency defined by the frequency of the clock pulse φ14.

The signal j21 is the camera shake waring signal and is made High when the shutter time value is slower than the critical shutter time value at which effect of the camera shake appears on a photograph. In this case, the marks CA1 and CA2 are alternately turned on and off.

The signals j22 to j27 are the signals representing the shutter time value. The combination of the signals j22 to j27 provides thirty-six shutter time values. When the signals j22 to j27 are all High, no shutter time is displayed.

The signals j32 to j37 are the signals representing the ISO sensitivity values of the photographic film. The combination of the signals j32 to j37 provides thirty-one ISO sensitivity values. When the signals j32 to j37 are all High, no ISO sensitivity value is displayed.

The signals j40 to j47 are the signals representing time values from 0 to 99 of the self timer. When the signals j40 to j47 are all High, no time value is displayed.

The signals j50 to j53 are the signals representing the exposure compensation values and the deviation values. Nine exposure compensation values and fourteen exposure deviation values can be obtained by the data applied from the CPU 10. When the signals j50 to j53 are all High, neither the exposure compensation value nor the exposure deviation value is displayed. Which of the exposure compensation value or metered manual exposure deviation is used value is used can be selected by the signals j55 and j56.

The signals j54 to j56 are the signals representing the sign attached to the exposure compensation value and the exposure deviation value. The signal j54 represents + and −. The signals j55 and j56 are used for switching the override value and the metered manual difference value for both of the external display unit 4 and the internal display unit 6.

The signal j57 is the signal used for displaying a preview operation which is made when confirming the depth of focus or checking the range of sharp focus in a photograph. When the preview switch S10 is closed, the signal j57 is High and the character F in the external display unit 4 is turned on and off repeatedly, further the display of the marks 102 and 106 are controlled in accordance with the AE mode, such as to turn off the mark 106 in the A mode.

The signal j60 is the signal for preferentialy displaying ISO value. In case the main switch SM is turned off and the signal OFFVLCD is High, the LD driving voltage is cut off. However even under such state, when the signal j60 is made High, the signal OFFVLCD can be turned to Low so as to supply the LCD driving voltage to the segment driver 24 and the common driver 25 (see FIG. 24). The signal j60 is not used alone but is used with the ISO display mode signal and the ISO data from the CPU 10. This state corresponds to the state just after the battery is mounted in the camera.

The signal j61 is the signal M'dMOVER (see FIG. 39) used to turn on and off the display value of the exposure deviation difference value. The signal j60 is made High for the blink when the metered manual exposure deviation value is without a given range.

The signal j62 is the shift signal SHIFT used to turn on and off the mark 204 during the program shift is set. The program shift means that combination of the diaphragm aperture value and the shutter time are manually shifted by equal degree but complimentarily keeping the suitable exposure value from the aperture diaphragm value and the shutter time set in the P mode. Specifically, assuming that the shutter time 1/250 sec. and the aperture value 5.6 are selected according to a predetermined program line in the P mode, a program shift might slow down the shutter time to 1/125 sec. while increasing the diaphragm aperture value to 8. When the signal j62 is High, the mark 204 is turned on and off repeatedly.

The signal j63 is an out of available control warning signal Not. CONT. (see FIG. 39) which is set High when the required diaphragm aperture value or shutter time value is out of the range of the available aperture diaphragm value and/or the shutter time value of the camera, whereby any one of the aperture diaphragm value and the shutter time value calculated according to the kind of the AE mode is turned on and off repeatedly.

The signal j64 is an out of available brightness warning signal BV (see FIG. 39) which is set High when the measured brightness is out of the range of the brightness which assure the correct measurement in the camera, whereby the marks 209 and 210 for the light measurement display are turned on and off repeatedly.

The signal j65 is the signal BULB used for switching the display of the display part 101 and 202 for four digits LCD elements from the shutter time value to the bulb exposure time value during the bulb exposure. When the signal j65 is High, the contents of the signals j40 and 47 representing the bulb count value can be displayed.

The signal j66 is the signal ALLOFF* used to cause all SEGn signals to be OFF wave form as shown in SEGn (L,L) of FIG. 30. When the signal j66 is Low, all of the display is turned off except for the mark 201.

The signal j67 is the signal ALLON used to cause all SEGn signals to be ON wave form as shown in SEGn (H,H) of FIG. 30. When the signal j66 is made High, all of the display is turned on except for the mark 201.

The signals j70 and j71 are the camera operation mode signals CALL MODE (see FIG. 39) representing any one of the AE mode, the stand-by mode, ISO setting mode and +/− mode. The contents of the display can be selectively changed depending on the states of the CALL MODE signals. Normally $\overline{j70 \cdot j71}$ is High. When ISO sensitivity setting mode is set, $\overline{j70} \cdot j71$ is High. When the standby mode is set, $j70 \cdot \overline{j71}$ is High. When the exposure compensation value setting mode is set, j70·j71 is High.

The signals j72 and j73 are the AE mode signals AE MODE representing any one of the programmed mode, diaphragm aperture priority mode, shutter time priority mode and manual mode.

The signal j74 is the signal ISO ARM for urging the ISO data setting. When the signal j74 is High, the ISO marks and ISO value both in the external display unit 4 and the internal display unit 6 are turned on and off repeatedly.

The signal j75 is the signal MODE OFF for turning off the AE mode display. When the signal j75 is High, the AE mode display is turned off. This signal is made High during preliminary film winding at the time of loading of the photographic film in the camera.

The signals j76 and j77 are the signals for switching the light measurement mode of the average light measurement mode and the spot light measurement mode. When the spot light measurement mode is set, any one of the signals j76 and 77 are made Low, whereby the mark 210 of the internal display unit 6 is turned on. The mark 209 is constantly turned on during the AE mode.

The data converter DC4 receives the external signals SM and $\overline{PWC}$ and is divided into three parts of a data code converter as shown in FIG. 26 for converting the display data except for the shutter time value and the diaphragm aperture value, a control code decoder as shown in FIG. 26 for outputting the control signals to turn on and off the respective LCD segments of the external display unit 4 and the internal display unit 6 and a switch data decoder as shown in FIG. 24 for outputting the control signals for the switch circuits SW1 and SW2.

The switch data decoder shown in FIG. 24 is arranged mainly to provide the signals for use in the switching circuits SW1 and SW2 in which FOM, CTR ISO and SS signals are used to control the switch circuit SW1 and MON, +/− ON signals are used to control the switch circuit SW2. $\overline{ON}$ and OFF signals respectively control and output control circuit CTL1 so as to turn on and off of the LCD segments of the display units 4 and 6. When the signal OFFVLCD is High, the power source to the display units 4 and 6 and the driver circuit are cut off in order to prevent application of DC voltage to the LCD segments of the display units 4 and 6 while the crystal oscillator XL2 is stopped and in order to save the power while the main switch SM is turned off.

In the circuit shown in FIG. 24, in case the AE mode is set and $\overline{j70 \cdot j71}$ is High, upon start of the camera with the signal $\overline{PWC}$ being Low, the signal FON becomes High the switch circuit SW1 is enabled and the signals j12 to j16 representing the diaphragm aperture value are applied to the decoder DC2 so that the diaphragm aperture data is applied to the display units 4 and 6 to be displayed thereon. When the signal PWC is High during the standby mode of the camera, the signal FON becomes Low, then the aperture value information is eliminated from the display.

When the signal $\overline{PWC}$ is Low with the signal j65 Low, the signal SS becomes High so that the signals j22 to j27 representing the shutter time value are selected and the data represented by the signals j22 to j27 are decoded, whereby the shutter time value is displayed. In this case the signals CTR and ISO are Low the timer count information and ISO value are deleted by the switch circuit SW1.

When the signal $\overline{PWC}$ is Low with the signal j65 High, namely when the bulb count mode is set, the CTR signal is High and the signals j40 and j47 representing the timer count information are selected and decoded and displayed. In this case, SS and ISO signals are Low the shutter time and ISO value are deleted by the switch circuit SW1. Further in this case, +/− ON signal is Low, MON signals is High so far as the signal $\overline{PWC}$ is Low and the signals j50 or j56 are Low, therefore, the exposure compensation value is deleted and the exposure deviation value is displayed.

When the ISO setting mode is set, the signals SS, CTR, FON, MON and +/− ON are Low but only the signal ISO is High, so that the switch circuit SW1 is enabled and the signals j32 to 37 representing the ISO value are selected, decoded and displayed. The other numeric display parts except for 101 and 202 are turned off.

During the standby mode, the signals SS, CTR, FON, MON and +/− ON are respectively Low so that all of the numeric display parts are turned off.

During +/− mode, the signals SS, ISO, CTR FON and MON are Low and the signal +/− ON is High is $\overline{PWC}$ Low, so that the signals j50 to j53 representing the exposure compensation value are selected, decoded and displayed.

The control data converter shown in FIG. 25 produces the control signals to turn on and off the respective LCD segments of the display units 4 and 6. When any one of the signals B1 to B8 is made High, the LCD segments corresponding to the signals B1 to B8 of High level can be turned on and off repeatedly if the LCD segment is in the displaying condition.

The signal B8 is used to turn on and off or blinking the F mark and is mainly controlled by the signal j57.

The signal B7 is used to turn on and off the numeric display part 208 of the internal display unit 6 and is mainly controlled by the signals j55, j56 and j61.

The signal B6 is used to turn on and off the display parts 209 and 210 of the internal display unit 6 and is mainly controlled by the signal j64.

The signal B5 is used to turn on and off the numeric display parts 104-1, 104-2 and 104-3 of the external display unit 4 and the numeric display part 206 of the internal display unit 6 and is mainly controlled by the signal j63.

The signal B4 is used to turn on and off the numeric display parts 101 of the external display unit 4 and 202 of the internal display unit 6 and is mainly controlled by the signals j63 and j74.

The signal B3 is used to turn on and off the AE mode display parts of the external and internal display units 4 and 6 and is mainly controlled by the signal j62.

The signal B2 is used to turn on and off the ISO mark 100 of the external display unit 4 and is mainly controlled by the signal j74.

The signal B1 is used to turn on and off all parts of the display units 4 and 6 except for the display parts controlled by the signals B8 to B2 and the mark 201. The signals B8 to B1 are also controlled by the signal j20.

The circuit arrangement shown in FIG. 26 is the data decoder for decoding the data of all parts of the display units 4 and 6 except for the numerical display parts. The circuit can be controlled by the signals j54 to j57, j70 to j73, j75 to j77, j21, $\overline{PWC}$ and the output q40 of the decoder DC2 to produce the outputs r51 to r69. When any one of the signals r51 to r69 is made high, the LCD segment corresponding to the high level signal can be turned on.

In the switch circuit SW1 shown in FIG. 11, the signals j12 to j16 representing the diaphragm aperture value, j22 to j27 representing the shutter time value, j32 to j37 representing the ISO value and j40 to j47 representing the timer count value are applied thereto. Each of the NAND gates can be opened when the corresponding signal of one of FON, CTR, ISO and SS is High and passes the input jn to the output pn. When the signals FON, CTR etc. are Low, the corresponding NAND gate is closed to make its output High.

For example, when FON is High, the input signals j12 to j16 are directly outputted as the signals p12 to p16. When FON is Low, the outputs p12 to p16 are all made High.

The data decoder DC1 is applied with the outputs p22 to p27, p32 to p37, p40 to p47 of the switch circuit SW1 and converts the input data into the signals q1 to q39. The operation of the data decoder DC1 is briefly explained with reference to FIGS. 20 and 21. For example, when the signals p22 to p27="LLLLL" corresponding to the bulb of the shutter time value is inputted to the data decoder DC1, (in this case, the other signals p32 to p37, p40 to p47 are made all High in the switch circuit SW1 and the decoder DC4) the output data q7 representing the character "b" for the decoder SD1, q18 representing the character "L" for the decoder SD2, q29 representing the character "u" for the decoder SD3 and q39 representing the character "b" for the decoder SD4 are respectively present.

As another example, in case the data p37 to p32="LHHHLL" corresponding to the ISO value 200 is inputted to the data decoder DC1, (in this case, the other signals p22 and p27 and p40 to p47 are made all High) the output data q1 representing 0 for SD1, q8 representing 0 for SD2 and q21 representing 2 for SD3 are present. The output for SD4 is absent.

When the signals p22 to p27, p32 to p37 and p40 to p47 are all High, none of the data for the decoders SD1 to SD4 is present.

The operation of the segment decoders SD1 to SD4 is explained hereinafter.

The signals q1 to q7 obtained in the data decoder DC1 are inputted to the segment decoder SD1, and q8 to q18, q19 to q29 and q30 to q39 obtained in the data decoder DC1 are inputted to the segment decoders SD2 to SD4 respectively. Each of the segment decoders SD1 to SD4 has the same circuit arrangement and each line to which the input signal is not applied is pulled up to the plus terminals of the power source. The segment decoder is so arranged that when the input line is Low, an effective output signal is present at the corresponding output line.

For example, when the input q7 representing the character "b" is inputted to the segment decoder SD1, the $\bar{b}$ input becomes Low. In this case the other inputs q1 to q6 of the decoder SD1 and the pulled up inputs are all High. The the output lines (c), (d), (e), (f) and (g) are all High with the other output lines (a), (b) and (h) are Low. The signals on the lines (c), (d), (e), (f) and (g) corresponding to the outputs r3 to r7 of the segment decoder SD1 can be transferred to the display units 4 and 6 through the output control circuit CTL1. The lines (a) to (g) of the outputs of the segment decoder SD1 correspond to the segments labeled by (a) to (g) of digit LCD element of the display units 4 and 6 as shown in FIGS. 3 and 4. Thus, the lines (c), (d), (e), (f) and (g) correspond to the character "b".

Another example is shown below. When the signal q21 is applied to the segment decoder SD3, the line $\bar{2}$ is made Low with the outputs (a), (b), (d), (e) and (g) are High and the character "2" can be displayed.

The signals p12 to p16 obtained by the switch circuit SW1 are applied to the data decoder DC 2. When p12 to p16 are LLLLL, a Low output q40 appears. The Low output q40 is applied to the segment decoder SD5 and the decoder DC4.

The signals q40 to q62 representing the diaphragm aperture values of twenty-three kinds as shown in SD5 of FIG. 23. The signals q40 to q62 are applied to the segment decoder SD5 for decoding them into the signals r30 to r43. In the above example, when q40 is Low, the decoded output corresponds to "- -".

In the decoder DC3, the input j50 represents the value smaller than the decimal point. The outputs p1 and p2 can be obtained by the input j50. The inputs j51 to j53 represent the data 0 to 6 and the corresponding outputs are p3 to p9 of High level. The outputs p3 to p9 are fed to the switch circuit SW2 and controlled by MON and +/− ON signals. When the signal MON is High, +/− ON signal is Low and the signals p2 to p9 are reversed to produce at outputs q82 to q89 with the outputs q71 to q78 being High. When the signal +/− ON is High, the signal MON is Low and the signals p1 to p7 are reversed to produce at outputs q71 to q77 with the outputs q82 to q89 being High. When the signals MON and +/− ON are Low, the outputs q71 to q78, q82 to q89 are all High. The outputs q71 to q78 of the switch circuit SW2 are applied to the segment decoder SD5 and the outputs q82 to q89 to SD6.

The signals q71 to q78 are used to display seven exposure compensation values and the decimal point and the signals q82 to q89 are used to display seven integers of the exposure deviation value with the numeric 0.5 as shown in FIGS. 22 and 23.

The details of the segment decoder SD6 are similar to the arrangement of the segments decoders SD1 and Sd4 and 25e details thereof are herein omitted.

The details of the output control circuit CTL1 is shown in FIGS. 18 and 19 and its logical truth table is shown in the table 1. In FIG. 19, when a High signal is inputted to the terminal r69, the gates corresponding to S69 and S70 are opened to output the reversed signals at S69 and S70 corresponding to the clock pulse $\phi 14$, so that the marks CA1 and CA2 are turned on and off repeatedly to give the operator the image of a vibrating camera.

As shown in the table 1, when $\overline{ON}$ signal is Low, all outputs except for S69 and S70 are made High to turn on all display parts of the eternal display unit 4 and internal display unit 6 except for the mark 201.

When $\overline{ON}$ signal is High with OFF signal being Low, all outputs except for S69 and S70 are made Low to turn off the all display parts except for the mark 201.

In case $\overline{ON}$ signal is High with OFF signal being Low, when any one of the signals B1 to B8 is Low, the input signal $r_m$ can be outputted so that the display units 4 and 6 display the possible information decided by the serial data.

In case $\overline{ON}$ signal is High with OFF signal being Low, when any of the signals B1 to B8 are High, the display of the outputs S in the same group in the table 1 are turned on and off with the frequency of the clock pulses $\phi 14$ corresponding to the combination of B and r in the table 1.

For example, when only the signal B6 is High, the outputs S59 and S60 corresponding to the signals r59 and r60 in the group containing the signal B6 are made High and Low to turn on and off the marks 209 and 210. However, if the signals r59 and r60 are Low, such change of the outputs S59 and S60 does not occur. Thus the blinking of the marks 209 and 210 occur only when the marks are displayed.

The outputs S1 to S70 of the output control circuit CTL1 are applied to the segment drivers SD1 and SD6 to provide the outputs at the terminals SEG1 to SEG35 and the LCD segment drive signals as shown in FIG. 30 can be outputted.

The relation between the output of the output control circuit CTL1 and the terminals SEGn is shown in the table 2. The name of the segments are the same shown in FIG. 4.

When the main switch SM is turned on, an interruption signal is applied to the CPU 10, which is released from the stopped state, starting its operation under the control of the program stored in the ROM. As soon as the main switch SM is turned on, power is supplied to a light measurement circuit in the camera. However at the time of application of the power, the light measurement circuit typically takes a brief time on the order of 0.1 miliseconds inherently before performing the light measurement and the necessary calculation under the stable manner. On the other hand, the high speed CPU can operate immediately after the application of the power, so that CPU 10 completes communication of the serial data with the display units 4 and 6 at least one time before the operation of the light measurement circuit stabilizes. The serial data contains mainly the exposure information such as the diaphragm exposure value and shutter time value. However if the light measurement circuit is not stabilized as mentioned above, reliable exposure information can not be obtained. Thus, it is not only nonsense to communicate the serial data but harmful since the display units may display unreliable exposure information. In order to avoid this drawback, in the preferred embodiment, the display units 4 and 6 are adapted to display the last information which was used in the past operation so long as a new serial data communication is not performed. In place of using the last data, a standby data or shut down data may be used.

When the battery 11 is mounted in the camera, the power source voltage +E is applied to the CPU 10 and the display circuit 20. The crystal oscillator XL1 with higher frequency than that of the crystal oscillator XL2 may start its oscillation earlier than the oscillation of the crystal oscillator XL2. Once the crystal oscillator XL1 has started its oscillation, the CPU 10 operates according to the instructions provided by the ROM. Since CPU 10 has little to do at the time of mounting the battery, the CPU 10 stops its operation after some 0.1 miliseconds after the battery mounting, waiting for the next task. In general, rising of the oscillation of the crystal oscillator XL2 for the display circuit 20 has not been completed within 100 miliseconds to one second. In this period, the CPU 10 does not accept the communication of the serial data and the clock pulses $\phi2$ is not generated, thus the signal $\overline{LTCH}$ does not generated. On the other hand, so long as the serial data is not generated even if the oscillation of the crystal oscillator XL2 is already established, the data in the display circuit 20 is not updated because the signal $\overline{LTCH}$ is not generated as the signal $\overline{PWC}$, $\overline{CS}$, SDATA and SCK are not generated. In the arrangement mentioned above, the display units 4 and 6 may keep the unstable information obtained at the time of mounting of the battery. The drawback mentioned above can be avoided in the present invention by turning off the power to the display units 4 and 6 by the signals j10, j11 and POR generated from the power on reset circuit, thereby eliminating unreliable information from the display at the initial state. In case the power on reset circuit fails keep or it is not preferred that the display units keep remain suppressed, it is possible to display the necessary information in the display units 4 and 6 as soon as the reliable serial data is obtained by performing the communication of the serial data by the CPU 10 even in the period before the oscillation of the crystal oscillator XL2 is stabilized after the mounting of the battery so that when the oscillation of the crystal XL2 is stabilized, reliable data is displayed on the display units 4 and 6. In this case, the data to be displayed before the reliable data is obtained may be a data used for turning off the display unit, standby data or the like. In this case the CPU 10 operates to communicate the display data such as standby data mentioned above before the oscillation of the crystal oscillator XL2 is stabilized after mounting of the battery, then the CPU 10 is stopped if there is no work. In this case interruption to the CPU 10 should be disabled before the crystal oscillator XL2 is stabilized.

Just before the CPU 10 is stopped, the CPU 10 transfers the display data of the standby mode to the display units 4 and 6. Thereafter, if the display data does not change, the contents displayed on the display units 4 and 6 do not change to continue the standby mode. When the main switch SM is tuned off but just before the CPU 10 is stopped, the CPU 10 transfer the data to eliminate the display on the display units 4 and 6. Unless the main switch SM is turned on, the display is kept eliminated since no data is transferred to the display units 4 and 6.

ALL ON and ALL OFF

When the signal $\overline{j10}\cdot j11$ is High, the power supply to the display units 4 and 6 are cut off with the first priority.

The signals j66 and j67 are provided for the test of the connection of the display units 4 and 6. When the signal j67 is High, the signals having the wave form to turn on all LCD segments of the display units 4 and 6 can be outputted from the terminals SEGn and COM. When the signal j66 is Low, the signals having the wave form to turn off all LCD segments of the display units 4 and 6 can be outputted from the terminals SEGn and COM. The signals j66 and j67 have the second priority. When such turn on signals mentioned above are applied to every LCD segments, each LCD segment having right connection is turned on but LCD segment having a wrong connection can not be turned on. When the turn off signals mentioned above are applied to every LCD segments, each LCD segment having the right connection is turned off but LCD segment having wrong connection can not be turned off. Thus any wrong connection to the LCD segments can be easily found.

One way of making the serial data all High is to pull up the line SDATA by connecting the line SDATA to the line +E through a low resistor so as to cause the signal j 67 to be High, thereby resulting in all turn on mode. In order to make the serial data all Low, the line SDATA is pulled down to the ground GND through a low resistor so as to cause the signal j66 to be High resulting in the all turn off mode. The methods mentioned above are very effective to test the connection to the display units not only during assembling of the camera in the manufacturing process but after the completion of assembling of the camera. Further it is advantageous that the above methods are available to test without provision of any specific terminals.

STANDBY MODE AND TURNOFF MODE

FIG. 38 shows an example of the display on the external display unit 4 under the standby mode. In the standby mode only the bar 103 is displayed. The internal display unit 6 is not displayed. In this case, all operation of the camera is stopped but the CPU 10 is waiting for interruption. The power is supplied to only the CPU 10 and the display circuit 20. When any interruption such as the signal from the switch S1 is applied to the CPU 10 by the operation of the shutter button 2, the power is supplied to the necessary parts so as to start the various functions of the camera.

Turn off mode is enabled by making the signal OFFVLCD High. In this case, the CPU 10 waits the interruption from the main switch SM and only the display circuit 20 and CPU are supplied with the power.

In the turn off mode, only the main switch SM is alive or available. On the contrary, in the standby mode, the various operation switches such as the light measurement switch S1 is alive. Therefore, the power consumption in the turn off mode is smaller than that in the standby mode. In the turn off mode, since no power is supplied to the display units 4 and 6, the life of the LCD elements can be extended.

DISPLAYING THE MARK OF THE DATA MANUALLY OPERABLE

In the diaphragm aperture priority mode i.e., the A mode, the mark 106 is displayed to show that the diaphragm aperture value can be manually set with the mark 102 for the shutter time setting which is now inoperable to set eliminated as shown in FIG. 32(a).

In the shutter time priority mode, i.e., the S mode, the mark 102 is displayed to show that the shutter time value can be manually set with the mark 106 which is now inoperable eliminated as shown in FIG. 33(a).

In the manual mode, i.e., the M mode, both marks 102 and 106 are displayed to show that both of the shutter time and diaphragm aperture value can be manually set as shown in FIGS. 34(a).

In the program mode, i.e., the P mode, since there is no value which can be manually set, the marks 102 and 106 are eliminated.

These operation of turning on and off of the marks can be performed by the signals j72 and j73 for use in the AE mode.

When it is detected that the interchangeable lens is not attached by a lens detecting means (by the switch S15), the diaphragm aperture value from the photographic lens is absent. In such case, the mark 106 is eliminated by the signal q40 regardless of what mode is set.

DISPLAY OF A FULL OPEN DIAPHRAGM APERTURE VALUE

The diaphragm aperture value is displayed by the numeric display parts 104 and 206. The contents of the diaphragm aperture value for the display are shown in FIG. 23. The signal q40 which is used in case of absence of the lens is used to display the marks - - on the numeric display parts 104 and 206.

The signals q43 to q62 are used to display the diaphragm aperture value expressed every round off 0.5 Ev value.

On the other hand, there are such values 3.5 and 4.5 conventionally used as the full open diaphragm aperture value. Since the full open diaphragm aperture values conventionally used as mentioned above are not suitable to use with the aperture values scaled by unit of 0.5 Ev, there are provided the signals q41 and q42 to display the values 3.5 and 4.5. In this way, when the diaphragm aperture value which is manually set or is the result of the calculation by the CPU 10 is the full open diaphragm aperture values such as 3.4 or 4.8 which corresponds to the conventionally used value 3.5 or 4.5, the CPU 10 modifies the values 3.4 or 4.8 into 3.5 or 4.5 and the data 3.5 or 4.5 are outputted to the display units 4 and 6. When the diaphragm aperture value which is manually set or is the result of the calculation by the CPU 10 is not the full open diaphragm aperture value, the CPU 10 generates the value 3.4 or 4.8 for the display.

An example of the above case is shown in FIGS. 36(a) and 36(b).

Judgment of whether or not the manually set or calculated diaphragm aperture value is the full open diaphragm aperture value is made in such a manner as mentioned below.

Figure 43:
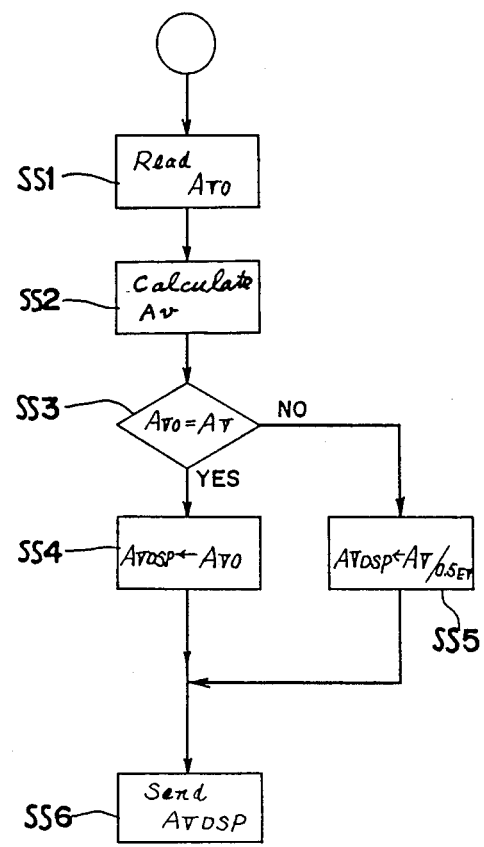
Figure 44:
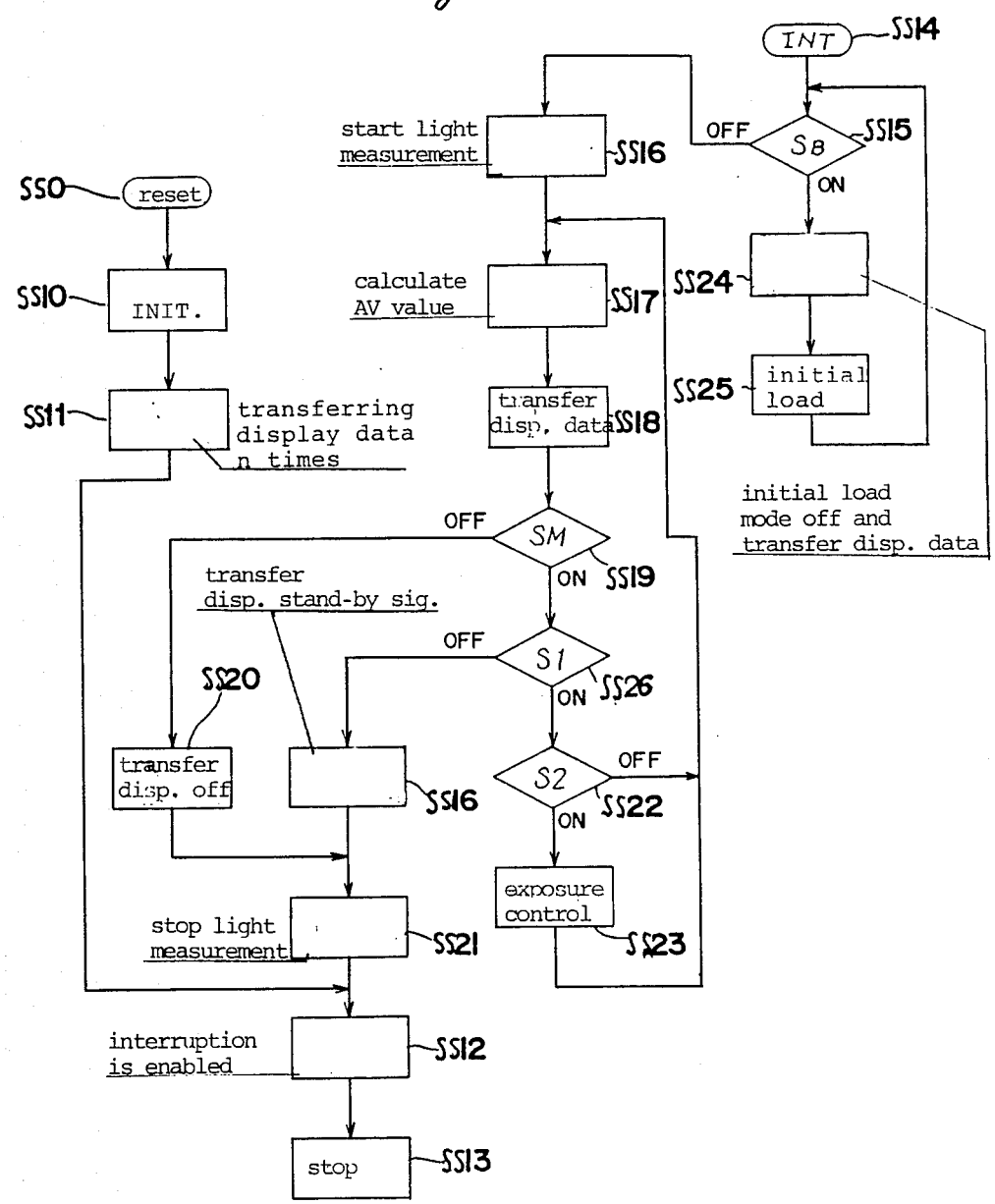

As shown in FIG. 43, the CPU 10 reads the full open diaphragm aperture value Avo from the interchangeable lens 3 in the step SS1, storing the value Avo in the register in the CPU 10. The CPU 10 calculates a diaphragm aperture value Av (referred to as a calculated F value) on the basis of the result of light measurement and other necessary values set in the camera in the step SS2. Subsequently the CPU 10 judges whether or not Avo=Av in the step SS3. With Avo=Av, the full open diaphragm aperture value Avo is adopted in the step SS4. On the other hand, when the calculated F value Av is not equal to Avo, the calculated F value Av is adopted in the step SS5 and quantized by every 0.5 Ev value. For example if the calculated F value is 3.3, the value 3.3 is quantized into 3.4. If the value is 4.6, the value 4.6 Ev is quantized into 4.8. Then the data AvDSP of the signals j12 to j16 for displaying the diaphragm aperture value adopted in the steps SS4 or SS5 is transferred to the display circuit 20 in the step SS6.

COMBINED USE OF THE DISPLAY DEVICE FOR THE EXPOSURE COMPENSATION VALUE AND THE EXPOSURE DEVIATION VALUE

The value +6.5 shown in FIG. 34(b) displayed in the display part 208 in the internal display unit 6 is the exposure deviation value. The exposure deviation value is displayed in case of the M mode. The available range of the exposure deviation value which can be displayed is +6.5 Ev to −6.5 Ev as shown in the right column in FIG. 23. If the exposure deviation value is out of the range, any one of the values +6.5 or −6.5 is turned on and off repeatedly. The display part 208 is turned on and off when the signal j61 named M'dOVER is High.

The value +1.5 shown in FIG. 36(b) displayed in the display part 208 in the internal display unit 6 is the exposure compensation value. This can be displayed by manual setting in case of AE mode except for the M mode. The range of the exposure compensation value which can be displayed in the display part 208 is +4.0 to −4.0 Ev as shown in the central column of FIG. 23. The exposure compensation value can not be set beyond the range. When the value displayed in the display part 208 is the exposure compensation value the display part 208 is always turned on and off to the operator to inform that the content now displayed is the exposure compensation value rather than the exposure deviation value.

The external display unit 4 is adapted to be turned on at the display part 104 to display the mark +/− in case of the exposure compensation. The display part 104 is not displayed in case of the exposure deviation mode.

Since the exposure deviation value and the exposure compensation value are stored in the same register, there is provided the control signals j54 to j56 represented by SIGN for discriminating the exposure deviation value from the exposure compensation value. The relation between the contents of the display and the contents of the signals j54 to 56 is shown in the table 3.

DISPLAY OF THE S MODE AND A MODE.

In FIG. 32(b), in the A mode, the display part 205 in the internal display unit 6 is turned on. The tapered side of the mark of the display part 205 is directed toward the diaphragm aperture value of the manual set. In the S mode as shown in FIG. 33(b), the display part 203 is turned on. The tapered side of the mark of the display part 203 is directed toward the shutter time value of manual set. By the display mentioned above, the operator can easily recognize the meaning of the AE mode and the displayed numeric value.

FIGS. 41(a) and (b) show the contents of the display during the initial loading just after the mounting of the photographic film in the camera. While the photographic film is preliminarily fowarded during the initial loading, the camera is controlled under the shutter time value 1/4000 with the maximum diaphragm aperture value (F22 in the present example). In such a state, the exposure mode display parts 203 to 205 are all eliminated by making the signal j75 High.

FIGS. 42(a) and (b) show the display when the exchangeable lens is not attached to the camera. When the CPU 10 detects that the photographic lens is not attached to the camera, the signals j12 to j16 are all made Low in the step SS18 shown in FIG. 44. The data converter DC2 provides the q40 signal by the signals j12 to j16 to make the signals r62 of the data converter DC4 Low. Accordingly the display of the diaphragm aperture value on the display part 104 as - - with the display part 106 turned off.

SUMMARY OF THE CONTROL OF THE CPU 10

Figure 47:
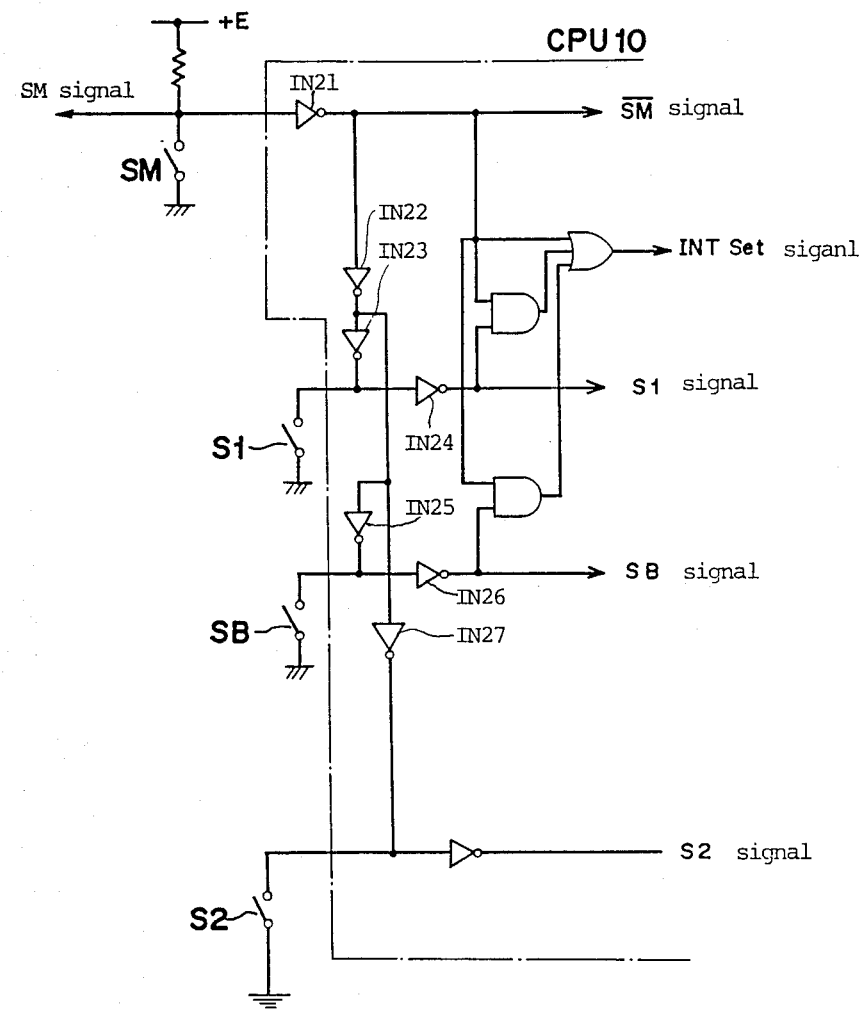
FIG. 47 is a schematic connection diagram of essential portion of the various switches.

When the battery 11 is mounted in the camera, the CPU 10 starts at the step SS0 and the display circuit 20 receives the power supply. Then all parts including the CPU 10 are initialized in the step SS10. Subsequently, in the step SS11, the display data, turning off data, standby data and ISO data etc. are transferred to the display circuit 20 more than one time. Said number of times of transferring the data can be determined corresponding to the length of time until the display circuit 20 can operate in a stable manner. When the necessary data is transferred, an interruption from any operation switches enabled the CPU 10 in the step SS12. In case where the there is no specific operation to the camera, the CPU 10 stops stopping the internal clock in the step SS13. The light measurement switch S1 and the initial loading switch SB are related with respect to the main switch SM as shown in FIG. 47. When the main switch SM is turned off, the light measurement switch S1 and the initial loading switch SB are pulled down to GND by the inverters IN21 to IN25. Namely the S1 and SB signals are disabled. In this case only the main switch SM can provide the interruption signal INTset. When the INT set signal is generated from the main switch SM by turning on the main switch SM, an interruption flip flop (not shown) is set to enable the interruption in the step SS14. The flip flop can be set by the positive edge of the INT set signal and once the interruption is enabled, the flip flop is reset to wait subsequent interruption.

When the interruption is enabled, it is detected whether the switch SB is turned on or off in the step SS15. If the switch SB is turned off, the light measurement circuit (not shown) starts the light measurement in the step SS16. Then the exposure calculation is performed in the step SS17, the necessary display data for the display unit 4 and 6 are transferred in the step SS18. If it is detected in the step SS19 that the main switch SM is turned off, the CPU 10 transfers the data to turn off the display units 4 and 6, and then stop the light measurement in the steps SS20 and SS21. Subsequently the program flow goes to the steps SS12 and SS13. In case it is detected in the step SS19 that the main switch SM is turned on, the switch S1 is checked in the step SS26. With off of the switch S1, the stand by data is transferred to the display circuit 20 and the program flow goes to the steps SS16, SS21, SS12 and SS13. If the switch S1 is turned on, the release switch S2 is checked. If the switch S2 is turned on, the exposure control is performed in the step SS23 then the program flow goes to the step SS17. On the other hand, if the switch S2 is turned off, the program flow goes to the step SS17 directly to perform exposure calculation.

In case it is detected in the step SS15 that the initial loading switch SB is turned on, the shutter time value, diaphragm aperture value for the initial loading, the MODE OFF signal j75 of High level are outputted in the step SS24. Then the initial loading is made in the step SS25 to execute the shutter control with the initial shutter time value and diaphragm aperture value. Thereafter, the initial loading switch SB is checked in the step SS15 and the program flow goes to the step SS16 to perform the light measurement depending on the state of the initial loading switch SB.

In case the main switch SM is turned on, the interruption to the CPU 10 is enabled by the operation of the switch S1 or SB.

The initial loading switch SB is made on when the presence of the photographic film in the camera is detected and the rear cover is closed and made off when the film counter is "1".

FIG. 46 shows the operation of detection of the critical condition where the camera shake photographing occurs. In the step SS31, the CPU 10 reads the necessary data such as focus length and so on from the lens. Then in the step SS32, shutter time value Tv is calculated by the exposure calculation, then the shutter time value $Tv_L$ at the critical warning point at which the camera shake occurs is calculated. Then the value Tv is compared with the value $Tv_L$ in the step SS33. In case $Tv < Tv_L$, the program flow goes to the step SS34. In case $Tv \geq Tv_L$, the program flow goes to the step SS35. In the step SS34, the LOWSS signal is made High to turn on and off repeatedly the marks CA1 and CA2 of the display part 201 to warn the camera shake. In the step SS35 the signal LOWSS is made Low to eliminate the marks CA1 and CA2.

FIGS. 45(a), (b) and (c) show one modification of the display part 201 which is formed by three parts CA1, CA2 and CA3 and the parts CA1 and CA3 are alternately turned on and off to show the camera shake.

TABLE 1

$$S2n = \overline{ON} \cdot r2n \cdot \overline{OFF} \cdot Bm \cdot \phi_{14}$$

| ON | OFF | Bm | $\phi_{14}$ | S2n |
| --- | --- | --- | --- | --- |
| L | — | — | — | H |
| H | H | — | — | L |
| H | L | L | — | r2n |
| H | L | H | L | r2n |
| H | L | H | H | L |

Combination of r2n and Bm
B1 : r51 to r53, r61 to r65
B2 : r54
B3 : r55 to r58, r67 r68
B4 ; r1 to r29
B5 : r30 to r43
B6 ; r59, r60
B7 : r4 to r50
B8 : r66

TABLE 2

| Segment | For COM1 | | For COM2 | | external display | internal display |
|---|---|---|---|---|---|---|
| 1 | 1-a | S1 | 1-b | S2 | Y | Y |
| 2 | 1-c | S3 | 1-d | S4 | Y | Y |
| 3 | 1-e | S5 | 1-f | S6 | Y | Y |
| 4 | 1-g | S7 | 2-a | S8 | Y | Y |
| 5 | 2-b | S9 | 2-c | S10 | Y | Y |
| 6 | 2-d | S11 | 2-e | S12 | Y | Y |
| 7 | 2-f | S13 | 2-g | S14 | Y | Y |
| 8 | 2-h | S15 | 3-a | S16 | Y | Y |
| 9 | 3-b | S17 | 3-c | S18 | Y | Y |
| 10 | 3-d | S19 | 3-e | S20 | Y | Y |
| 11 | 3-f | S21 | 3-g | S22 | Y | Y |
| 12 | 4-a | S23 | 4-b | S24 | Y | Y |
| 13 | 4-c | S25 | 4-d | S26 | Y | Y |
| 14 | 4-e | S27 | 4-f | S28 | Y | Y |
| 15 | 4-g | S29 | 5-a | S30 | Y | Y |
| 16 | 5-b | S31 | 5-c | S32 | Y | Y |
| 17 | 5-d | S33 | 5-e | S34 | Y | Y |
| 18 | 5-f | S35 | 5-g | S36 | Y | Y |
| 19 | col. 1 | S37 | 6-a, 6-d | S38 | Y | Y |
| 20 | 6-b | S39 | 6-c | S40 | Y | Y |
| 21 | 6-e | S41 | 6-f | S42 | Y | Y |
| 22 | 6-g | S43 | 7-a, 7-d | S44 | Y | Y |
| 23 | 7-b | S45 | 7-c | S46 | X | Y |
| 24 | 7-e | S47 | 7-f | S48 | X | Y |
| 25 | 7-g | S49 | col. 2,3 | S50 | X | Y |
| 26 | MT+ | S51 | MT−, | S52 | X | Y |
| 27 | bar | S53 | ISO | S54 | Y | X |
| 28 | S | S55 | P.PROGR | S56 | Y | Y |
| 29 | A2 | S57 | M2 | S58 | X | Y |
| 30 | AS2 | S59 | AS1 | S60 | X | Y |
| 31 | TA1 | S61 | TA2 | S62 | Y | X |
| 32 | OR+ | S63 | OR− | S64 | Y | X |
| 33 | ORS | S65 | F | S66 | Y | X |
| 34 | A1 | S67 | M1 | S68 | Y | X |
| 35 | CA1 | S69 | CA2 | S70 | X | Y |

Y : available to display, X : unavailble to display,

TABLE 3

| | display data | | | | display pattern | | |
|---|---|---|---|---|---|---|---|
| operate mode | j71 | j70 | j56 | j55 | j54 | external display | internal display | |
| AE mode | L | L | L | L | — | F (F value) | (F value) | FIGS. 31 (a),(b) |
| | L | L | H | L | L | [+/−] F (F value) | (F value) + (+/− value)* | FIGS. 36 (a),(b) |
| | L | L | H | L | H | [/−] F (F value) | (F value) − (+/− value)* | |
| | L | L | — | H | L | F (F value) | (F value) + (M value) | FIGS. 34 (a),(b) |
| | L | L | — | H | H | F (F value) | (F value) − (M value) | |
| +/− mode | H | H | L | L | — | [+/−] (+/− value) | (+/− value) ± | +/− value = 0 |
| | H | H | H | L | L | [+/] (+/− value) | (+/− value) + | FIGS. 35 (a),(b) |
| | H | H | H | L | H | [/−] (+/− value) | (+/− value) − | |

*blinking

What is claimed is:

1. A display device for use in a camera being operable according to a program exposure control mode in which camera exposure is controlled according to a predetermined program, the display device comprising:

light measuring means for measuring light from an object to be photographed;

decision means for deciding an exposure value based on the result of the light measurement by said light measuring means;

calculating means for calculating a first shutter speed and a first diaphragm aperture value using the result of the decision of said decision means and the program;

first display means for providing a visible indication that the camera is in the program exposure control mode;

a manual operating member on said camera;

shift means for selectively shifting the first shutter speed and the first diaphragm aperture value in accordance with the operation of said manual operating member in such a manner that one of the first shutter speed and first diaphragm aperture value is increased and the other of the first shutter speed and first diaphragm aperture value is decreased; and display control means for controlling said first display means in such a manner that (1) said first display means is continuously turned on when the shift means has not been engaged to shift said first shutter speed and said first diaphragm aperture value, and (2) said first display means is turned on and off when said shift means has been engaged to shift said first shutter speed and said first diaphragm aperture value.

2. The display device according to claim 1, wherein said first display means is provided on the outer surface of the camera.

3. The display device according to claim 2, further comprising second display means provided in a viewfinder of the camera for providing a visible indication that the camera is in the program exposure control mode.

4. The display device according to claim 3, wherein said first display means indicates that the camera is in the program exposure control mode by displaying a string of characters, and wherein said second display means indicates that the camera is in the program control mode by displaying one or more characters contained in the string of characters.

5. The display means according to claim 1, wherein said first display means is provided in a viewfinder of the camera.

6. The display device according to claim 2, further comprising further display means for displaying the first diaphragm aperture value and first shutter speed as shifted by the shift means.

7. The display device according to claim 3, further comprising further display means for displaying the first diaphragm aperture value and first shutter speed as shifted by the shift means.

8. The display device according to claim 4, further comprising further display means for displaying the first diaphragm aperture value and first shutter speed as shifted by the shift means.

9. The display device according to claim 5, further comprising further display means for displaying the first diaphragm aperture value and first shutter speed as shifted by the shift means.

10. A display device for use in a camera operable according to a program photographing mode, said display device comprising:
 display means for providing a visible indication that the camera is in the program photographing mode;
 means for modifying a diaphragm aperture value and shutter speed value which are calculated in the program photographing mode to arrive at a changed diaphragm aperture value and a changed shutter speed value; and
 display control means for controlling said display means in such a manner that when the exposure control is performed with unmodified shutter speed and diaphragm aperture values calculated in the program photographing mode said display means is continuously turned on, otherwise when exposure control is performed with the shutter speed and diaphragm aperture values as modified by said modifying means, said display means is turned on and off.

11. The display device according to claim 10, further comprising:
 light measuring means for measuring light from an object to be photographed;
 decision means for deciding an exposure value based on the result of the light measurement by said light measuring means; and
 calculating means for calculating a shutter speed and a diaphragm aperture value using the result of the decision of said decision means and the program line,
 wherein the program photographing mode is a program exposure control mode.

* * * * *